United States Patent
Hixson et al.

(10) Patent No.: US 12,477,015 B2
(45) Date of Patent: Nov. 18, 2025

(54) APPARATUS, METHODS, AND PROGRAM PRODUCTS FOR MONITORING THE BEHAVIOR OF ATTENDEES OF A VIDEO CONFERENCE

(71) Applicant: Lenovo (Singapore) Pte. Ltd., New Tech Park (SG)

(72) Inventors: Dane Hixson, Eden, UT (US); Matthew Fardig, Boonville, IN (US); Faisal Mohamed, Mebane, NC (US); Lindsay Nelson, Highlands Ranch, CO (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/571,007

(22) Filed: Jan. 7, 2022

(65) Prior Publication Data
US 2023/0224339 A1    Jul. 13, 2023

(51) Int. Cl.
*H04L 65/1083* (2022.01)
*G06V 40/20* (2022.01)
*G09B 5/14* (2006.01)
*G10L 25/57* (2013.01)
*G10L 25/63* (2013.01)

(52) U.S. Cl.
CPC ......... *H04L 65/1083* (2013.01); *G06V 40/20* (2022.01); *G09B 5/14* (2013.01); *G10L 25/57* (2013.01); *G10L 25/63* (2013.01)

(58) Field of Classification Search
CPC ...... H04L 65/1083; G06V 40/20; G09B 5/14; H04N 7/14; H04N 7/141; H04N 7/12; H04N 7/15; H04N 7/157; H04M 3/56; H04M 2250/62

USPC ..................................................... 348/14.02
See application file for complete search history.

(56) References Cited

U.S. PATENT DOCUMENTS

| | | | |
|---|---|---|---|
| 2020/0090536 A1* | 3/2020 | Xiong | G06F 3/1423 |
| 2022/0165013 A1* | 5/2022 | Velez | A63F 13/213 |
| 2022/0345537 A1* | 10/2022 | Samms | H04L 67/535 |
| 2022/0400026 A1* | 12/2022 | Guggari | G06Q 10/1093 |
| 2023/0319233 A1* | 10/2023 | Sommerlade | G06V 40/103 |
| | | | 348/14.16 |

* cited by examiner

*Primary Examiner* — Maria El-Zoobi
(74) *Attorney, Agent, or Firm* — Kunzler Bean & Adamson

(57) ABSTRACT

Apparatus, methods, and computer program products for monitoring the behavior of attendees of a video conference are disclosed. One apparatus includes a processor and a memory that stores code executable by the processor. The code is executable by the processor to monitor behavior exhibited by each attendee of a video conference, determine, in real-time, that the behavior exhibited by one or more source attendees include one or more inappropriate behaviors that are directed to a target attendee, and transmit a notification to a moderator in response to determining that the behavior exhibited by the source attendee(s) include the inappropriate behavior(s) directed to the target attendee. In some apparatus, the notification identifies each source attendee, the target attendee, and each inappropriate behavior exhibited by each source attendee. Methods and computer program products that include and/or perform the operations and/or functions of the apparatus are also disclosed.

15 Claims, 17 Drawing Sheets

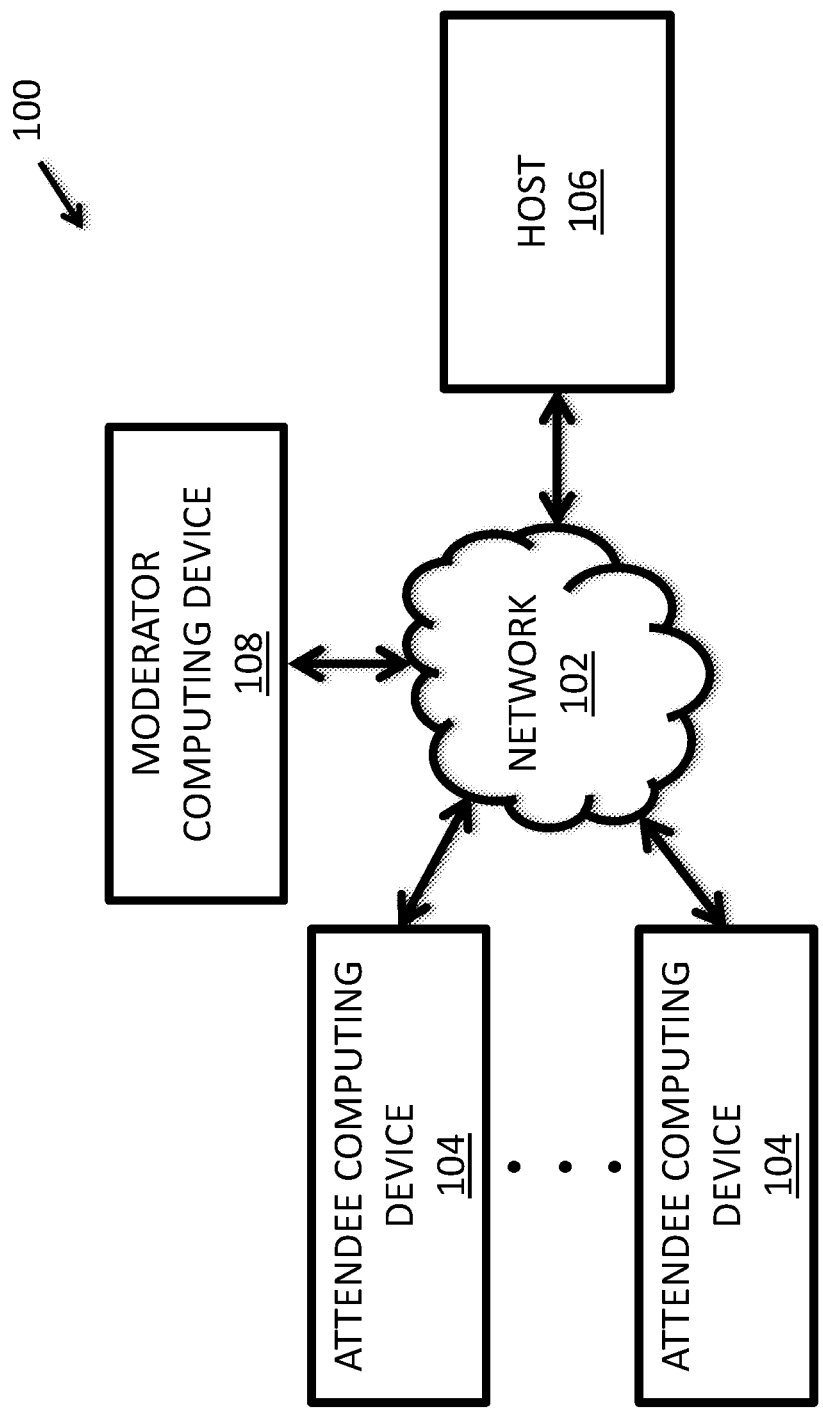

APPARATUS, METHODS, AND PROGRAM PRODUCTS FOR MONITORING THE BEHAVIOR OF ATTENDEES OF A VIDEO CONFERENCE

FIELD

The subject matter disclosed herein relates to video conferencing and more particularly relates to apparatus, methods, and program products for monitoring the behavior of attendees of a video conference.

DESCRIPTION OF THE RELATED ART

Modern school and work environments have increased the use of video conferencing in virtual classrooms and work meetings. Concurrent with this trend is the occurrence of inappropriate behavior in virtual classrooms and/or work meetings, which can include bullying and/or other socially unacceptable behavior. In the real world, a person that is in charge (e.g., a teacher, boss, adult, etc.) can pick up on behavioral/social cues that can be utilized to identify and/or determine that there is some sort of trouble and/or potential trouble occurring between attendees (e.g., students, colleagues, workers, etc.) of a live meeting. However, in a video conference (e.g., a virtual classroom, a virtual work meeting, etc.), the same type of behavioral/social cues are largely non-existent and/or the cues for determining that inappropriate behavior is occurring may be different than in an in-person environment.

BRIEF SUMMARY

Apparatus that can monitor the behavior of attendees of a video conference are disclosed. One apparatus includes a processor and a memory that stores code executable by the processor. The code is executable by the processor to monitor behavior exhibited by each attendee of a video conference, determine, in real-time, that the behavior exhibited by one or more source attendees of the video conference include one or more inappropriate behaviors that are directed to a target attendee of the video conference, and transmit a notification to a moderator of the video conference in response to determining that the behavior exhibited by the one or more source attendees of the video conference include the one or more inappropriate behaviors directed to the target attendee. In some apparatus, the notification identifies each source attendee, the target attendee, and each inappropriate behavior exhibited by each source attendee.

Also disclosed are methods for monitoring the behavior of attendees of a video conference. One method includes monitoring, by a processor, behavior exhibited by each attendee of a video conference, determining, in real-time, that the behavior exhibited by one or more source attendees of the video conference include one or more inappropriate behaviors that are directed to a target attendee of the video conference, and transmitting a notification to a moderator of the video conference in response to determining that the behavior exhibited by the one or more source attendees of the video conference include the one or more inappropriate behaviors directed to the target attendee. In some methods, the notification identifies each source attendee, the target attendee, and each inappropriate behavior exhibited by each source attendee.

Computer program products including a computer-readable storage device including code embodied therewith are further disclosed herein. The code is executable by a processor and causes the processor to monitor behavior exhibited by each attendee of a video conference, determine, in real-time, that the behavior exhibited by one or more source attendees of the video conference include one or more inappropriate behaviors that are directed to a target attendee of the video conference, and transmit a notification to a moderator of the video conference in response to determining that the behavior exhibited by the one or more source attendees of the video conference include the one or more inappropriate behaviors directed to the target attendee. In some computer program products, the notification identifies each source attendee, the target attendee, and each inappropriate behavior exhibited by each source attendee.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic block diagram of one embodiment of a computing system that can monitor the behavior of attendees of a video conference;

DETAILED DESCRIPTION

Figure 2A:
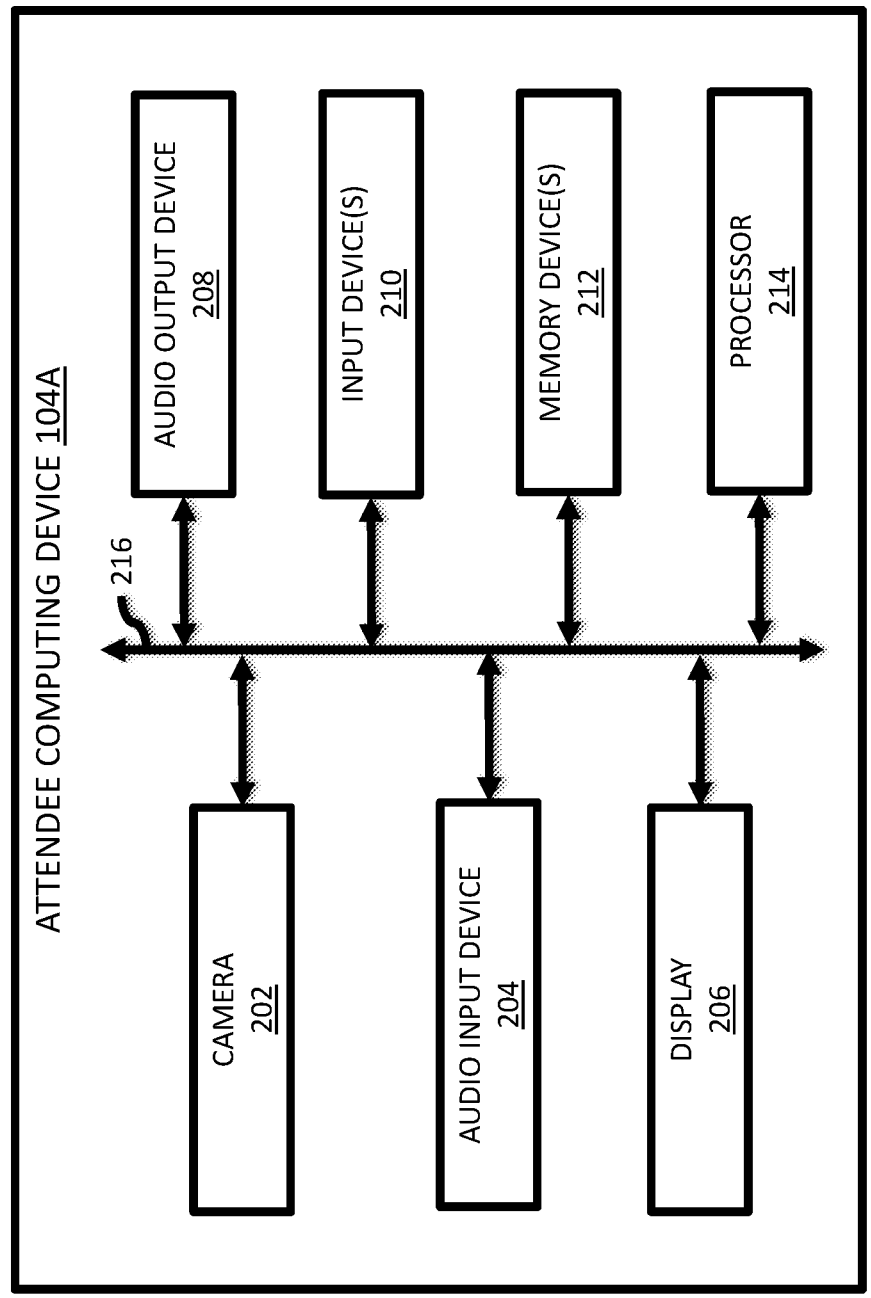
FIGS. 2A and 2B are schematic block diagrams of various embodiments of an attendee computing device included in the computing system of FIG. 1.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIG. 1 is a schematic block diagram of one embodiment of a computing system 100 (and/or computing network 100) that can monitor the behavior of attendees of a video conference. At least in the illustrated embodiment, the computing system 100 includes, among other components, a network 102 connecting a set of two or more attendee computing devices 104 (also simply referred individually, in various groups, or collectively as attendee computing device(s) 104), a host computing device 106 and/or host computing system 106 (or simply, host 106), and a moderator computing device 108 to one another.

The network 102 may include any suitable wired and/or wireless network 102 (e.g., public and/or private computer networks in any number and/or configuration (e.g., the Internet, an intranet, a cloud network, etc.)) that is known or developed in the future that enables the set of attendee computing devices 104, the host 106, and the moderator computing device 108 to be coupled to and/or in communication with one another and/or to share resources. In various embodiments, the network 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating (e.g., video conferencing) with one another that are possible and contemplated herein.

An attendee computing device 104 may include any suitable computing system and/or computing device capable of accessing and/or communicating with one another, the host 106, and the moderator computing device 108 via the network 102. Examples of an attendee computing device 104 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

With reference to FIG. 2A, FIG. 2A is a block diagram of one embodiment of an attendee computing device 104A. At least in the illustrated embodiment, the attendee computing device 104A includes, among other components, a camera 202, an audio input device 204, a display 206, an audio output device 208, one or more input devices 210, one or more memory devices 214, and a processor 214 coupled to and/or in communication with one another via a bus 216 (e.g., a wired and/or wireless bus).

A camera 202 may include any suitable device that is known or developed in the future capable of capturing and transmitting images, video feeds, and/or video streams. In various embodiments, the camera 202 includes at least one video camera.

An audio input device 204 may include any suitable device that is known or developed in the future capable of capturing and transmitting audio/sound, audio feeds, and/or audio streams. In various embodiments, the audio input device 204 includes at least one microphone.

A display 206 may include any suitable device that is known or developed in the future capable of displaying images, video feeds, and/or video streams. In various embodiments, the display 206 may include an internal display or an external display. In some embodiments, the display 206 is configured to display a video feed of the attendees (e.g., students, workers, adults, children, colleagues, etc.) and the moderator (e.g., an adult, a teacher, a boss, an individual in charge, etc.) of a video conference (e.g., a virtual classroom, a virtual meeting, etc.) while the video conference is in progress.

An audio output device 208 may include any suitable device that is known or developed in the future capable of receiving and providing audio/sound, audio feeds, and/or audio streams. In various embodiments, the audio output device 208 includes a speaker, a set of headphones, and/or a set of earbuds, etc., among other suitable audio output devices that are possible and contemplated herein.

An input device 210 may include any suitable device that is known or developed in the future capable of receiving user input. In various embodiments, the output device 210 includes a keyboard, a mouse, a trackball, a joystick, a touchpad, and/or a touchscreen, etc., among other suitable input devices that are possible and contemplated herein.

A set of memory devices 212 may include any suitable quantity of memory devices 212. Further, a memory device 212 may include any suitable type of device and/or system that is known or developed in the future that can store computer-useable and/or computer-readable code. In various embodiments, a memory device 212 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 214).

A memory device 212, in some embodiments, includes volatile computer storage media. For example, a memory device 212 may include random access memory (RAM), including dynamic RAM (DRAM), synchronous dynamic RAM (SDRAM), and/or static RAM (SRAM). In other embodiments, a memory device 212 includes non-volatile computer storage media. For example, a memory device 212 may include a hard disk drive, a flash memory, and/or any other suitable non-volatile computer storage device that is known or developed in the future. In various embodiments, a memory device 212 includes both volatile and non-volatile computer storage media.

Figure 3:
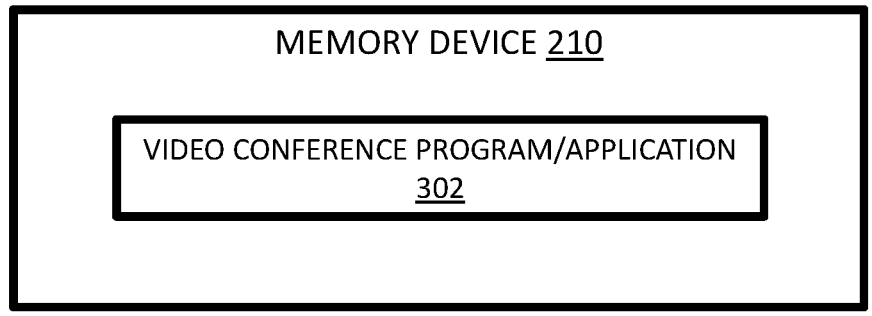
FIG. 3 is a schematic block diagram of one embodiment of a memory device included in the attendee computing devices of FIGS. 2A and 2B.

With reference now to FIG. 3, FIG. 3 is a schematic block diagram of one embodiment of a memory device 212A. At least in the illustrated embodiment, the memory device 212A includes, among other components, a video conferencing program and/or application 302, that is configured to operate/function when executed by the processor 214.

A video conferencing program/application 302 may include any suitable commercial and/or private video conferencing program and/or application that is known or developed in the future. Examples of a video conferencing program/application 302 include, but are not limited to, Microsoft Teams®, Zoom®, Google Meet®, Cisco Webex®, GoToMeeting®, Skype®, etc., among other video conferencing programs/applications that are possible and contemplated herein.

In various embodiments, a video conferencing program/application 302 is configured to utilize the camera 202 and the audio input device 204 to capture one or more images and one or more audios/sounds, respectively, and generate a video feed and/or video stream that includes the captured image(s) and audio(s)/sound(s) (e.g., of a user). The video feed and/or video stream that includes the captured image(s) and audio(s)/sound(s) of the user can include the behavior(s) of the user in real-time during the video conference. The video conferencing program/application 302 is further configured to transmit the video feed and/or video stream to one or more other attendee computing devices 104, to the host 106, and/or to one or more moderator computing devices 108.

In various embodiments, the video conferencing program/application 302 is further configured to receive video feeds and/or video streams from one or more other attendee computing devices 104 and/or the host 106. The video conferencing program/application 302 is also configured to utilize the display 206 and the audio output device 208 to display the image(s) and play the audio(s)/sound(s), respectively, in the received video feed and/or video stream (e.g., to a user).

The user behavior(s) captured by the camera 202 and/or input device 204, at various times, may include behavior that is socially appropriate for the video conference. Further, the user behavior(s) captured by the camera 202 and/or input device 204 may, at times, include behavior that is socially inappropriate for the video conference. In some situations, the socially inappropriate behavior(s) captured by the camera 202 and/or input device 204 may include, define, and/or constitute bullying behavior.

Socially inappropriate behavior may include any behavior that is considered outside the norm for any particular society and/or group. In various instances, the socially inappropriate behavior may include any auditory and/or visual cues capable of disparaging and/or slurring an ethic group, a race, a culture, a religious group, a political group/party/ideology, gender, age, a personal trait (e.g., name, height, weight, hair color, eye color, skin color, teeth, hygiene, gait, athletic ability, a level of intelligence, a handicap, a special need, family history and/or family trait, etc.), a non-binary individual/group, a sexual orientation, and/or the like.

Auditory cues can include, but are not limited to, any type of word(s), sound(s), and/or noise(s), etc., whether generated by a human (e.g., analog cues) and/or by a non-human (e.g., digital cues via a computing device/machine, a mechanical device/machine, etc.). Visual cues can include, but are not limited to, any type of gesture(s), typed message (e.g., chat, instant message, private message, etc.), picture(s), video(s), and/or other visual representation(s), etc., whether generated by a human (e.g., analog cues) and/or a non-human (e.g., digital cues via a computing device/machine, a mechanical device/machine, etc.).

In various situations, the captured socially inappropriate behavior exhibited by one or more attendees of a video conference (e.g., one or more source attendees) may be currently directed toward/at another attendee of the video conference (e.g., a target attendee). In some situations, the captured socially inappropriate behavior exhibited by the source attendee(s) has been directed toward/at the target attendee over time (e.g., on multiple occasions). In certain situations, the captured socially inappropriate behavior exhibited by the source attendee(s) has the potential to be currently directed toward/at the target attendee and/or the potential to be directed toward/at the target attendee in the future. As such, as used herein, the terms bullying and/or bullying behavior can include socially inappropriate behavior that is currently being exhibited by one or more source attendees and directed toward/at the target attendee, socially inappropriate behavior that has been exhibited by one or more source attendees and directed toward/at the target attendee over time and/or on multiple previous occasions, socially inappropriate behavior that is currently exhibited by one or more source attendees and that has the potential of being currently directed toward/at a target attendee, and/or socially inappropriate behavior that is being exhibited by one or more source attendees and has the potential of being directed toward/at a target attendee in the future, among other definitions that are possible and contemplated herein.

An attendee computing device 104 that generates and transmits a video feed and/or video stream that includes socially inappropriate behavior (e.g., bullying behavior) exhibited by its user can be referred to herein as, a source attendee computing device 104. An attendee computing device 104 that receives and/or is used by an attendee that is the target of any socially inappropriate behavior (e.g., bullying behavior) included in a video feed and/or video stream from one or more source attendee computing devices 104 can be referred to herein as, a target attendee computing device 104.

Referring back to FIG. 2A, a processor 214 may include any suitable non-volatile/persistent hardware and/or software configured to perform and/or facilitate performing various processing functions and/or operations. In various embodiments, the processor 214 includes hardware and/or software for executing instructions in one or more video conference modules and/or applications. The video conference modules and/or applications executed by the processor 214 can be stored on and executed from a memory device 212 and/or from the processor 214.

Figure 4:
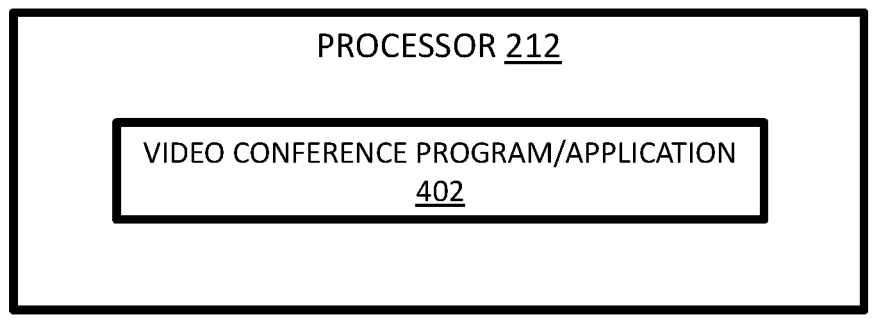
FIG. 4 is a schematic block diagrams of one embodiment of a processor included in the attendee computing devices of FIGS. 2A and 2B.

With reference to FIG. 4, FIG. 4 is a schematic block diagram of one embodiment of a processor 214. At least in the illustrated embodiment, the processor 214 includes, among other components, a video conference program/application 402 similar to the video conference program/application 302 in the memory device 212 discussed with reference to FIG. 3.

Figure 2B:
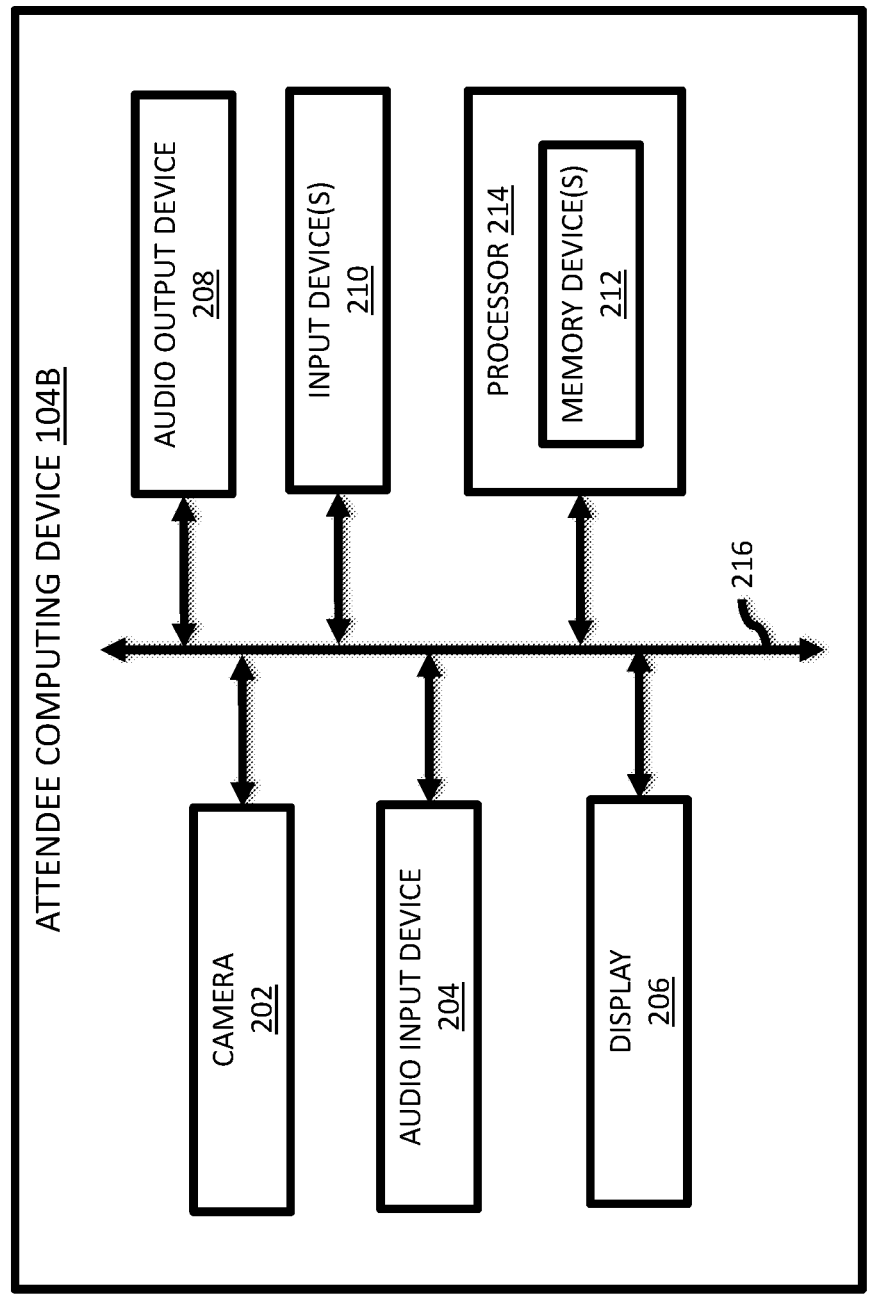

Referring to FIG. 2B, FIG. 2B is a block diagram of another embodiment of an attendee computing device 104B. The attendee computing device 104B includes, among other components, a camera 202, an audio input device 204, a display 206, an audio output device 208, one or more input devices 210, one or more memory devices 212, and a processor 214 coupled to and/or in communication with one another via a bus 216, similar to the camera 202, audio input device 204, display 206, audio output device 208, input device(s) 210, memory device(s) 212, processor 214, and bus 216 discussed with reference to the attendee computing devices 104A illustrated in FIG. 2A. Alternative to the attendee computing device 104A, the processor 214 in the attendee computing device 104B includes the memory device(s) 212 as opposed to the memory device(s) 212 of the attendee computing device 104A being a different device than and/or independent of the processor 214.

With reference again to FIG. 1, a host 106 may include any suitable computer hardware and/or software that can monitor the behavior of attendees of a video conference (e.g., a virtual classroom, virtual meeting, etc.). In various embodiments, a host computing device 106 can include one or more processors, computer-readable memory, and/or one or more interfaces, among other features and/or hardware. A host computing device 106 can further include any suitable software component or module, or computing device(s) that is/are capable of hosting and/or serving a software application or services, including distributed, enterprise, and/or cloud-based software applications, data, and services. For instance, a host computing device 106 can be configured to host, serve, or otherwise manage video conferences, or applications interfacing, coordinating with, or dependent on or used by other services, including video conference applications and software tools for monitoring the behavior of attendees of a video conference. In some instances, a host 106 can be implemented as some combination of devices that can comprise a common computing system and/or device, server, server pool, or cloud computing environment and share computing resources, including shared memory, processors, and interfaces.

Figure 5A:
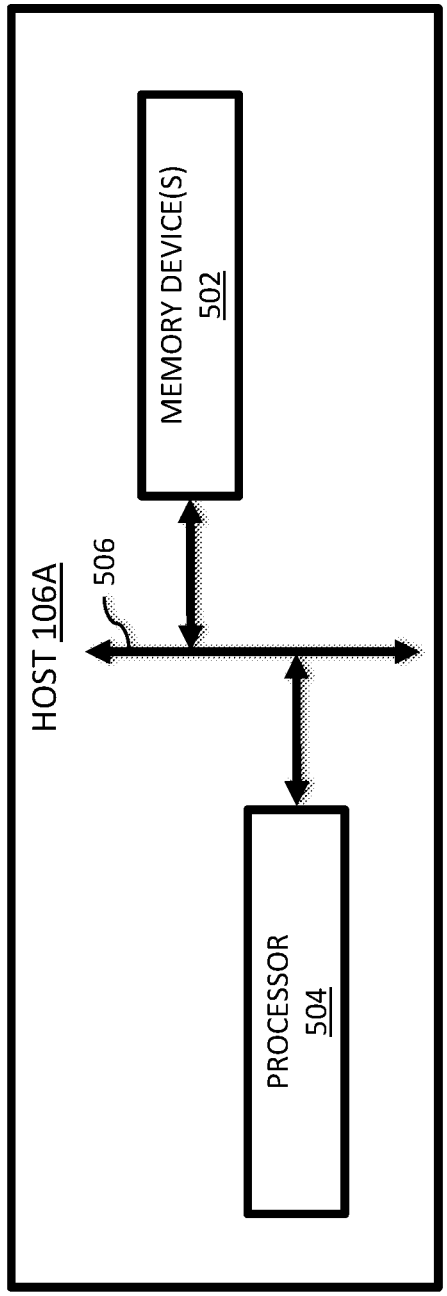
FIGS. 5A and 5B are schematic block diagrams of various embodiments of a host computing device included in the computing system (and/or computing device) of FIG. 1.

Referring to FIG. 5A, FIG. 5A is a block diagram of one embodiment of a host 106A. At least in the illustrated embodiment, the host 106A includes, among other components, a set of one or more memory devices 502 and a processor 504 coupled to and/or in communication with one another via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer storage media. For example, a memory device 502 may include RAM, including DRAM, SDRAM, and/or SRAM. In other embodiments, a memory device 502 includes non-volatile computer storage media. For example, a memory device 502 may include a hard disk drive, a flash memory, and/or any other suitable non-volatile computer storage device that is known or developed in the future. In various embodiments, a memory device 502 includes both volatile and non-volatile computer storage media.

Figure 6A:
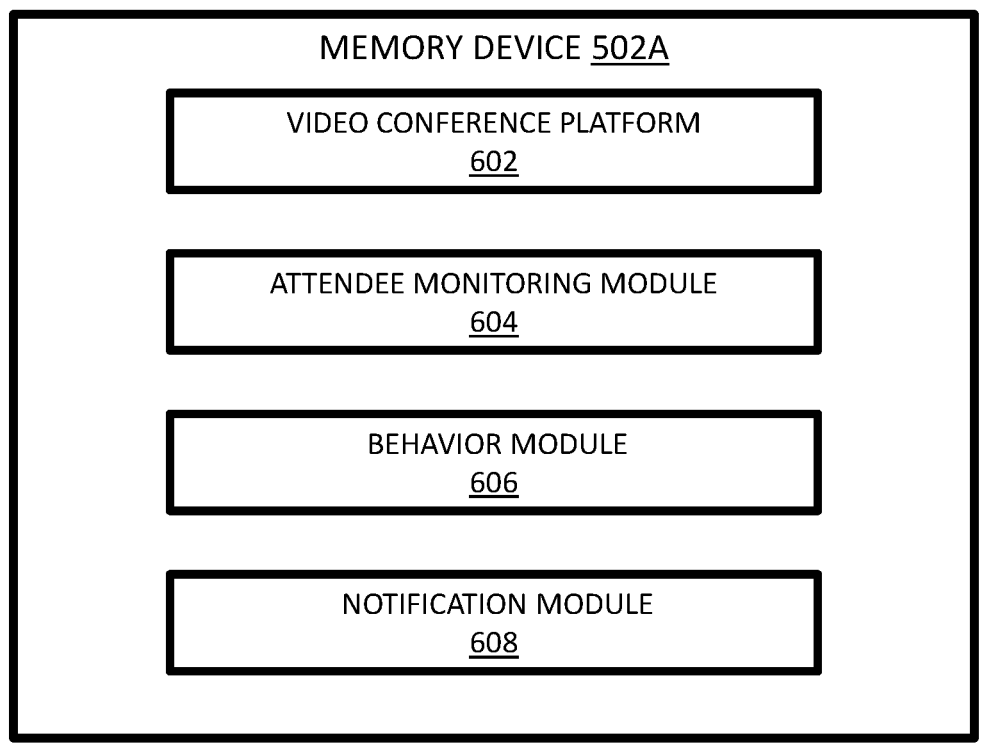
FIGS. 6A and 6B are schematic block diagrams of various embodiments of a memory device included in the host computing devices of FIGS. 5A and 5B.

With reference now to FIG. 6A, FIG. 6A is a schematic block diagram of one embodiment of a memory device 502A. At least in the illustrated embodiment, the memory device 502A includes, among other components, a video conferencing platform 602, an attendee monitoring module 604, a behavior module 606, and a notification module 608 that are each configured to operate/function in conjunction with one another when executed by the processor 504 to monitor the behavior of attendees of a video conference.

A video conferencing platform 602 may include any suitable commercial and/or private video conferencing program and/or application that is known or developed in the future. In various embodiments, a video conferencing platform 602 is configured to transmit the video feeds and/or video streams generated by the attendee computing devices 104 and the moderator computing device 108 to one another.

The video feed and/or video stream generated by each attendee computing device 104 (e.g., a source computing device) and the moderator computing device 108 can include audio and/or video of its user (e.g., attendee) and/or written/digital messages input by the user/attendee. The audio, video, and/or messages of each user of an attendee computing device 104 can represent and/or convey the behavior(s) of the user (e.g., a student, worker, colleague, peer, etc.) of an attendee computing device 104.

An attendee monitoring module 604 may include any suitable hardware and/or software that can monitor each attendee of a video conference via their respective video feed and/or video stream. In various embodiments, the attendee monitoring module 604 is configured to monitor each attendee of a video conference by searching, in real-time, their respective video feeds and/or video streams for auditory cues and/or visual cues that can define the behavior(s) of an attendee.

In some embodiments, the attendee monitoring module 604 does nothing if the video feed/stream of an attendee does not include any auditory cues and/or visual cues. That is, the video filter detection module 604 continues monitoring/searching the video feeds/streams generated by an attendee computing device 104 for auditory cues and/or visual cues that may be contained therein.

In certain embodiments, the attendee monitoring module 604 is configured to notify and/or transmit a notification to a behavior module 606 in response to the attendee monitoring module 604 determining/detecting that a video feed and/or video stream generated by an attendee computing device 104 includes one or more auditory cues and/or visual cues that may convey and/or be indicative of the behavior(s) of its associated attendee. Here, the notification can identify that a video feed/stream from a particular attendee and/or the video feed/stream from multiple attendees each include one or more auditory cues and/or one or more visual cues conveying and/or indicating the behavior(s) of the attendee(s).

A behavior module 606 may include any suitable hardware and/or software that can receive notifications from an attendee monitoring module 604 indicating that a video feed and/or video stream includes one or more auditory cues and/or one or more visual cues that convey and/or indicate the behavior(s) of the attendee(s) of a video conference. The behavior module 606 may further include any suitable hardware and/or software that can determine whether the auditory cue(s) and/or visual cue(s) included in the video feed/stream of each attendee define socially appropriate behavior, socially inappropriate behavior, and/or bullying behavior.

In various embodiments, the behavior module 606 is configured to determine and/or identify a type of behavior for each attendee based on the auditory cue(s) and/or visual cue(s) included in each respective video feed/stream. That is, the behavior module 606 is configured to determine and/or identify, in real-time, whether the behavior(s) exhibited by each attendee is socially appropriate, socially inappropriate, and/or bullying based on the auditory cue(s) and/or visual cue(s) in their respective video feeds/streams.

A type of behavior (e.g., whether a behavior of the attendee is socially appropriate, socially inappropriate, or bullying, etc.) can be determined/identified using any suitable technique, characteristics, and/or metrics that can distinguish different types of behavior. In various embodiments, the behavior module 606 is configured to determine/identify the type of behavior based on comparing the auditory cue(s) and/or visual cue(s) in a video feed/stream to auditory cue(s) and/or visual cue(s) that define inappropriate behavior(s) and/or bullying behavior(s).

In some embodiments, the behavior module 606 is configured to store a set of auditory cues and/or a set of visual cues that define one or more inappropriate behaviors and/or one or more bullying behaviors. The inappropriate behavior(s) and/or bullying behavior(s) may be defined by one or more auditory cues and/or one or more visual cues that are consistent with, for example, taunting, sneering, jeering, scoffing, belittling, deriding, ridiculing, making fun of, mocking, poking fun at, digging at, putting down, jabbing, rudeness, sarcasm, mimicking, and/or laughing at, etc., among other behaviors that may be considered socially inappropriate and/or bullying.

The behavior module 606, in various embodiments, is configured to compare the auditory cue(s) and/or visual cue(s) in the video feed/stream of each attendee to the auditory cue(s) and/or visual cue(s) defining an inappropriate behavior and/or a bullying behavior to determine if there is a match. In various embodiments, the behavior module 606 is configured to determine that the behavior(s) of an attendee are socially appropriate in response to a non-match of the auditory cue(s) and/or visual cue(s) in the video feed/stream of an attendee and the auditory cue(s) and/or visual cue(s) defining an inappropriate behavior and/or a bullying behavior. In additional or alternative embodiments, the behavior module 606 is configured to determine that the behavior(s) of an attendee are socially inappropriate and/or include bullying in response to a match of the auditory cue(s) and/or visual cue(s) in the video feed/stream of an attendee and the auditory cue(s) and/or visual cue(s) defining an inappropriate behavior and/or a bullying behavior.

In some embodiments, a match includes one or more auditory cues in the video feed/stream of an attendee matching one or more auditory cues defining an inappropriate behavior and/or a bullying behavior. For example, an inappropriate behavior and/or a bullying behavior may be defined to include a list of words, names, and/or descriptions that when verbalized by an attendee and/or electronically/digitally generated in response to an input by an attendee that is/are directed at another attendee (e.g., a target attendee) and/or has the potential to be directed at another attendee (e.g., a potential target attendee), can constitute and/or be considered inappropriate behavior and/or bullying.

In some embodiments, the behavior module 606 can perform an emotional analysis on the auditory cue(s) of an attendee to determine whether an attendee is exhibiting inappropriate behavior and/or bullying behavior. For example, the behavior module 606 can identify inappropriate behavior and/or bullying behavior via emotional analysis based on the volume, tone, intensity, prolongation, speed, intonation, cadence, repetition, and/or one or more patterns of speech (e.g., uncoordinated speech/sounds, murmuring/mumbling, speaking under one's breath, silly speech, angry speech, etc.), etc., of a voice, noise, and/or sound, among other indicators of emotion that are possible and contemplated herein.

In other embodiments, a match includes one or more visual cues in the video feed/stream of an attendee matching one or more visual cues defining an inappropriate behavior and/or a bullying behavior. For example, an inappropriate behavior and/or a bullying behavior may be defined to include a set of gestures (e.g., facial expression(s) (e.g., smiling too much, grinning, frowning, anger, etc.), acts (e.g., laughing, pretend crying, whimpering, etc.), body movements (pointing, mock saluting, etc.), etc.), a picture, and/or a video that when performed and/or shown by an attendee and/or electronically/digitally generated in response to an input by an attendee that is/are directed at another attendee (e.g., a target attendee) and/or has the potential to be directed at another attendee (e.g., a potential target attendee), can constitute and/or be considered inappropriate behavior and/or bullying. In other non-limiting examples, an inappropriate behavior and/or a bullying behavior may be defined to include a list of words, names, and/or descriptions that when typed by an attendee and/or otherwise electronically/digitally generated in response to an input by an attendee that is/are directed at another attendee (e.g., a target attendee) and/or has the potential to be directed at another attendee (e.g., a potential target attendee), can constitute and/or be considered inappropriate behavior and/or bullying. In still other non-limiting examples, an inappropriate behavior and/or a bullying behavior may be defined as increasing or decreasing the quantity of messages sent to a target attendee.

In some embodiments, the behavior module 606 can perform an emotional analysis on the visual cue(s) of an attendee to determine whether an attendee is exhibiting inappropriate behavior and/or bullying behavior. For example, the behavior module 606 can identify inappropriate behavior and/or bullying behavior via emotional analysis based on the gesture itself, the intensity of a gesture, the type of gesture, repetition of a gesture, cadence of a gesture, patterns of different gestures, etc., among other indicators of emotion that are possible and contemplated herein. In other non-limiting examples, the behavior module 606 can identify inappropriate behavior and/or bullying behavior via emotional analysis based on the actual words used/typed by an attendee, grammar, slang terms, abbreviations, and/or added emphasis (e.g., bold, capitalized, highlighted, underlined, spacing, font type, font size, different fonts, etc.), etc., among other indicators of emotion that are possible and contemplated herein.

In certain embodiments, a match includes one or more auditory cues or one or more visual cues in the video feed/stream of an attendee matching one or more auditory cues or one or more visual cues defining an inappropriate behavior and/or a bullying behavior. In further other embodiments, a match includes one or more auditory cues and one or more visual cues in the video feed/stream of an attendee matching one or more auditory cues and one or more visual cues defining an inappropriate behavior and/or a bullying behavior. In further embodiments, a match includes each auditory cue in the video feed/stream of an attendee matching each auditory cue defining an inappropriate behavior and/or a bullying behavior. In still further embodiments, a match includes each visual cue in the video feed/stream of an attendee matching each visual cue defining an inappropriate behavior and/or a bullying behavior. In additional embodiments, a match includes each auditory cue or each visual cue in the video feed/stream of an attendee matching each auditory cue or each visual cue defining an inappropriate behavior and/or a bullying behavior. In yet other embodiments, a match includes each auditory cue and each visual cue in the video feed/stream of an attendee matching each auditory cue and each visual cue defining an inappropriate behavior and/or a bullying behavior.

The behavior module 606, in certain embodiments, is configured to notify and/or transmit a notification to a notification module 608 in response to determining that the behavior(s) of an attendee are socially inappropriate and/or include bullying. Here, the notification can identify each source attendee, the target attendee, the socially inappropriate behavior, the bullying behavior, the auditory cue(s) and/or visual cue(s) exhibited by each source attendee defining the socially inappropriate behavior, and/or the auditory cue(s) and/or visual cue(s) exhibited by each source attendee defining the bullying behavior.

In various embodiments, the notification module 608 is configured to transmit, in real-time, a notice to the moderator computing device 108 in response to receiving the notification from the behavior module 606. In various embodiments, the notification transmitted to the moderator computing device 108 can identify each source attendee, the target attendee, the socially inappropriate behavior, the bullying behavior, the auditory cue(s) and/or visual cue(s) exhibited by each source attendee defining the socially inappropriate behavior, and/or the auditory cue(s) and/or visual cue(s) exhibited by each source attendee defining the bullying behavior, among other information and/or warnings that are possible and contemplated herein.

Figure 6B:
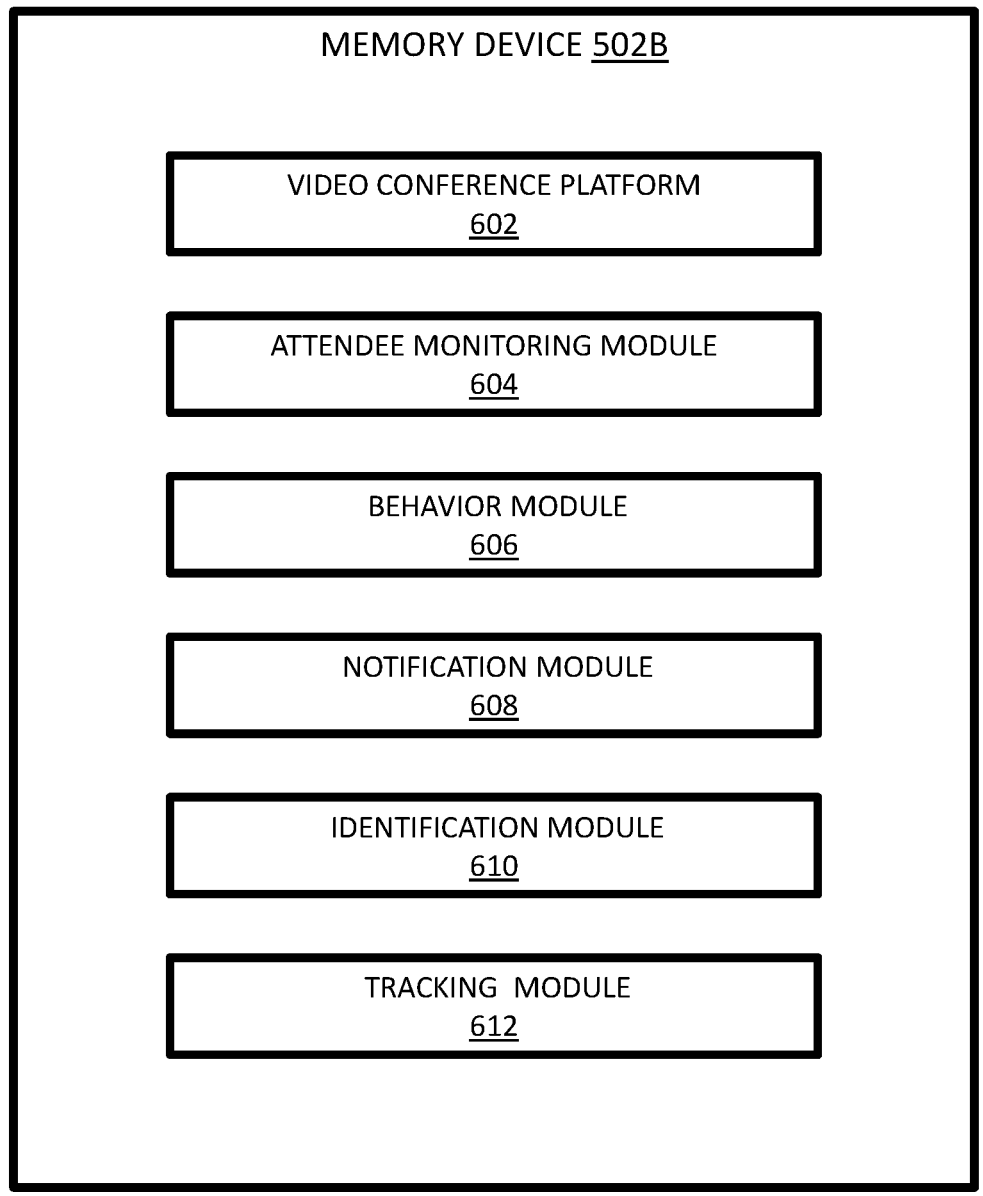

Referring now to FIG. 6B, FIG. 6B is a block diagram of another embodiment of a memory device 502B. The memory device 502B includes a video conferencing platform 602, an attendee monitoring module 604, a behavior module 606, and a notification module 608 similar to the video conferencing platform 602, attendee monitoring module 604, behavior module 606, and notification module 608 included in the memory device 502A discussed elsewhere herein. At least in the illustrated embodiment, the memory device 602B further includes, among other components, an identification module 610 and a tracking module 612.

An identification module 610 may include any suitable hardware and/or software that can identify a target attendee and/or target attendee computing device 104. The identification module 610 can identify the target attendee and/or target attendee computing device 104 using any suitable technique and/or method that can identify the direction and/or of inappropriate behavior and/or bullying.

In some embodiments, the identification module 610 is configured to identify a target attendee and/or target attendee computing device 104 via eye tracking. Here, the identification module 610 is configured to obtain the layout of the video conference from each respective attendee. In other words, the identification module 610 is configured to identify the virtual location of each attendee on the display 206 of each respective attendee computing device 104. That is, because each attendee may have the other attendees of the video conference located at different positions on their respective displays 206, the identification module 610 is configured to obtain the respective layouts from each attendee computing device 104.

In addition, the identification module 610 is configured to track the eyes and/or eye movement of each attendee relative to their respective layouts being displayed on their respective displays 206. In tracking the eyes and/or eye movement of each attendee relative to their respective layouts, the identification module 610 is configured to determine, detect, and/or identify the direction of the inappropriate behavior(s) and/or bullying behavior(s) exhibited by each source attendee based on where the eyes of each source attendee are focused. Further, based where each source attendee's eyes are focused, the identification module 610 can map the direction of the inappropriate behavior(s) and/or bullying behavior(s) exhibited by a source attendee to its respective layout to determine which attendee the inappropriate behavior(s) and/or bullying behavior(s) is/are being directed and identify the target attendee as the attendee to which the inappropriate behavior(s) and/or bullying behavior(s) is/are being directed.

In additional embodiments, the identification module 610 can, based where each source attendee's eyes are focused, map the direction of the inappropriate behavior(s) and/or bullying behavior(s) exhibited by each source attendee to their respective layouts in determining which attendee the inappropriate behavior(s) and/or bullying behavior(s) is/are being directed to from each source attendee. Here, the focus of each of the source attendees are cross referenced with one another to identify the target attendee as the attendee to which the source attendees are directing their respective inappropriate behavior(s) and/or bullying behavior(s).

Figure 11A:
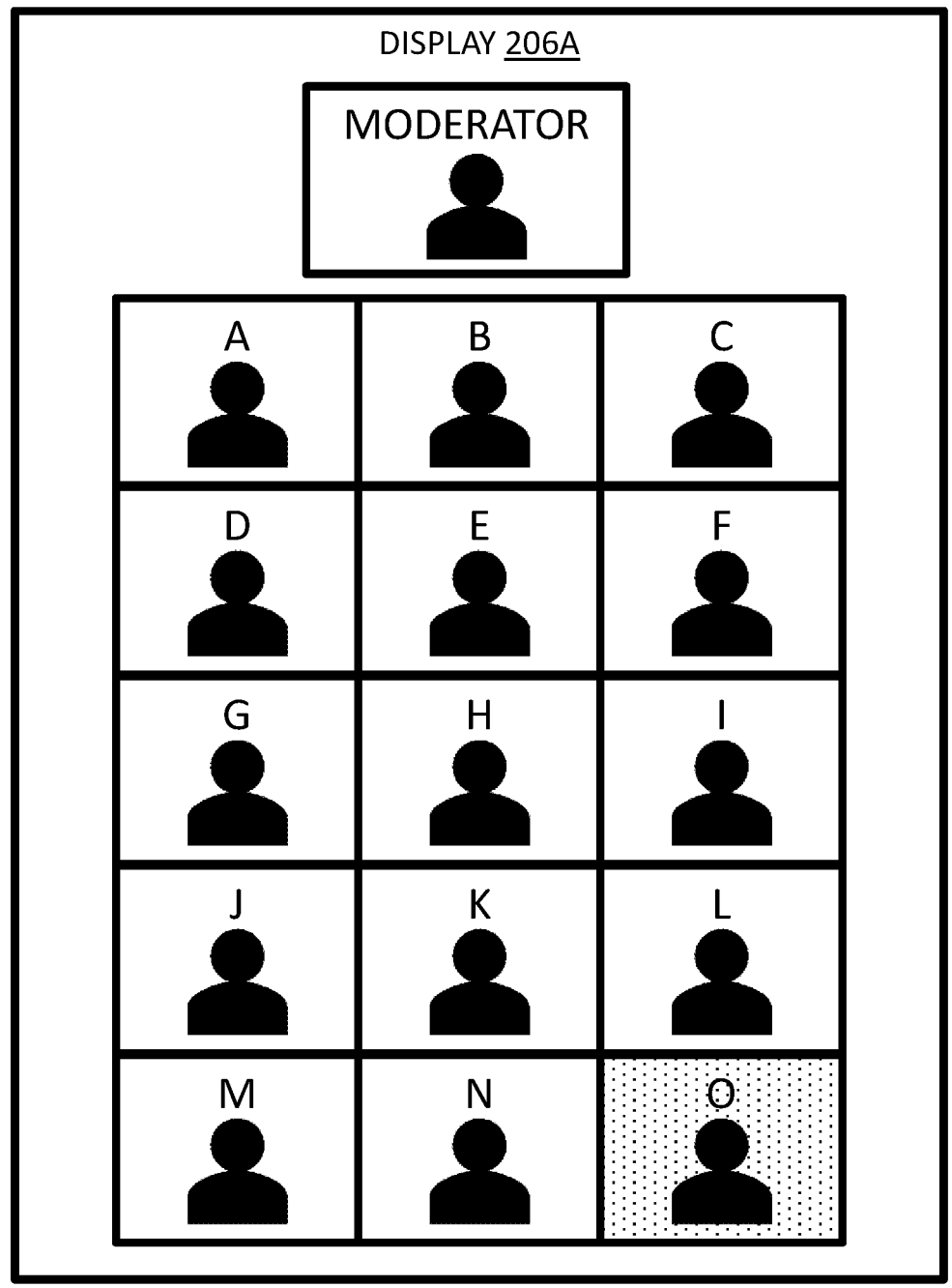
FIGS. 11A and 11B are block diagrams illustrating non-limiting examples of different layouts of a video conference being displayed on the displays of different attendees of the video conference.
Figure 11B:
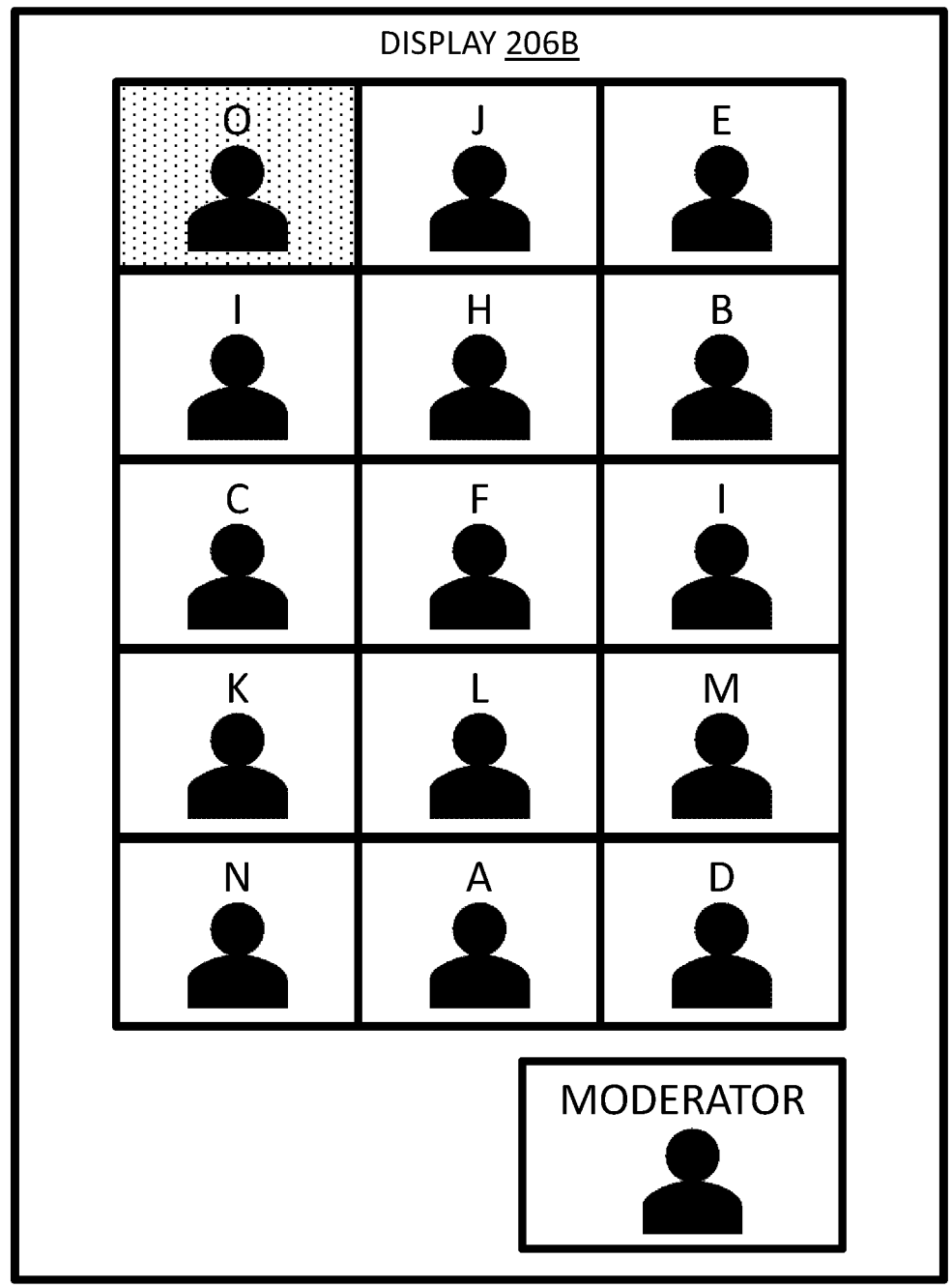

With reference to FIGS. 11A and 11B, FIGS. 11A and 11B illustrate non-limiting examples of the displays 206A and 206B, respectively, to illustrate the use of eye tracking to identify the target attendee. The identification module 610 can, via the camera 202 on each source attendee computing device 104, track the eye movements of each source attendee and determine the direction that each source attendee is looking to identify where on their respective displays 206A, 206B each source attendee is focusing. In FIG. 11A, the source attendee associated with the display 206A is focusing on the lower right-hand corner of the display 206A and map the source attendee's focus to attendee O based on attendee O being positioned in the lower right-hand corner of the display 206A. In FIG. 11B, the source attendee associated with the display 206B is focusing on the upper left-hand corner of the display 206B and map the source attendee's focus to attendee O based on attendee O being positioned in the upper left-hand corner of the display 206A.

In some embodiments, the identification module 610 can identify attendee O as the target of the inappropriate behavior(s) and/or bullying behavior(s) based on attendee O being in the direction of the focus of one of the source attendees associated with the displays 206A or 206B. In additional or alternative embodiments, the identification module 610 can cross reference the mapping of each source attendee's focus on their respective displays 206A, 206B to attendee O and identify attendee O as the target of the inappropriate behavior(s) and/or bullying behavior(s) based thereon.

Referring back to FIG. 6B, in additional or alternative embodiments, the identification module 610 is configured to identify a target attendee and/or target attendee computing device 104 via tracking private communications between attendees. In some embodiments, the identification module 610 is configured to identify the target attendee as the attendee to which private messages including inappropriate behavior and/or bullying behavior are being transmitted.

In additional or alternative embodiments, the identification module 610 is configured to track the quantity of messages transmitted between attendees. Here, an unexpected and/or uncommon increase in the quantity of private messages being sent to a particular attendee from one or more other attendees can identify the recipient of the increased quantity of private messages as the target attendee and the transmitters of the private messages as the source attendee(s).

A tracking module 612 may include any suitable hardware and/or software that can track the behaviors of each attendee of a video conference over time. In some embodiments, the tracking module 612 is configured to track which attendees have exhibited inappropriate behavior and/or bullying behavior in the past, the inappropriate behavior and/or bullying behavior exhibited by each source attendee in the past, the auditory cue(s) and/or visual cue(s) defining each inappropriate behavior exhibited by each source attendee in the past, and/or the visual cue(s) and/or visual cue(s) defining each bullying behavior exhibited by each source attendee in the past. In additional or alternative embodiments, the tracking module 612 is configured to track which attendees have target attendees in the past, the inappropriate behavior and/or bullying behavior directed to each target attendee in the past, the auditory cue(s) and/or visual cue(s) defining each inappropriate behavior directed to each target attendee in the past, and/or the visual cue(s) and/or visual cue(s) defining each bullying behavior directed to each target attendee in the past.

In various embodiments, the tracking module 612 is configured to determine correlations between the behaviors of one or more attendees that may amount to inappropriate behavior and/or bullying. That is, the tracking module 612 can determine and/or identify trends in the behavior of one or more attendees. For example, the tracking module 612 may identify that when attendee A is present, attendee B and attendee C exhibit inappropriate behavior but do not exhibit the inappropriate behavior when attendee A is not present. In another non-limiting example, the tracking module 612 may identify that when attendee A is not present, attendee B exhibits inappropriate behavior but does not exhibit the inappropriate behavior when attendee A is present.

Referring back to FIG. 5A, a processor 504 may include any suitable non-volatile/persistent hardware and/or software configured to perform and/or facilitate performing functions and/or operations for monitoring the behavior of attendees of a video conference. In various embodiments, the processor 504 includes hardware and/or software for executing instructions in one or more modules and/or applications that can perform and/or facilitate performing functions and/or operations for monitoring the behavior or attendees of a video conference. The modules and/or applications executed by the processor 504 for monitoring the behavior of attendees of a video conference can be stored on and executed from a memory device 502 and/or from the processor 504.

Figure 7A:
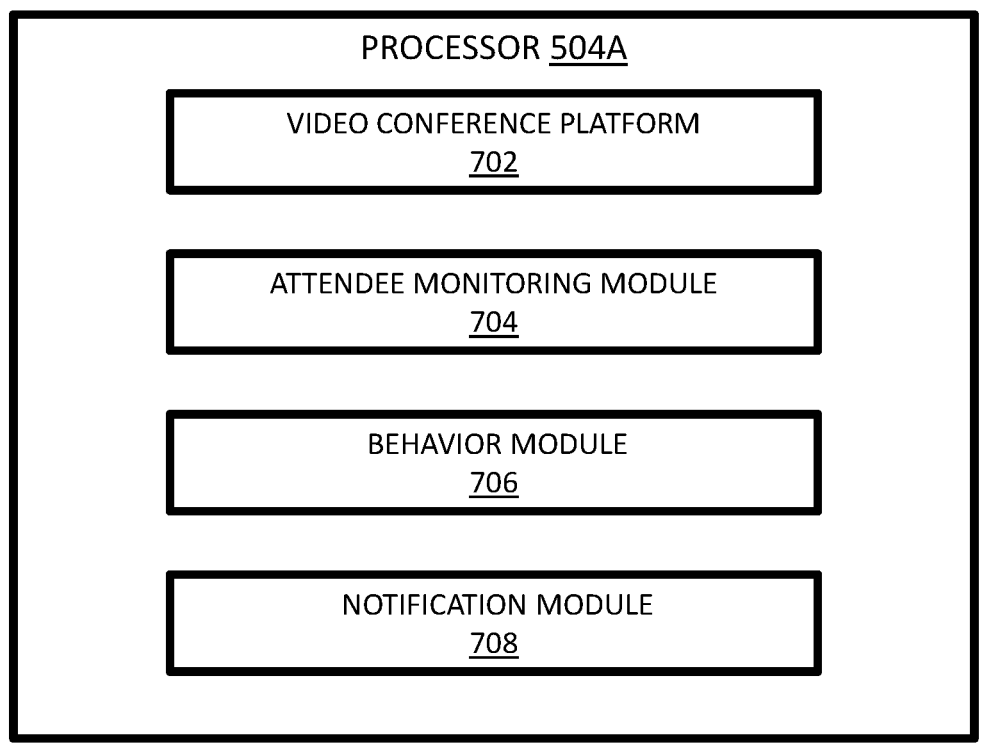
FIGS. 7A and 7B are schematic block diagrams of various embodiments of a processor included in the host computing devices of FIGS. 5A and 5B.

With reference to FIG. 7A, FIG. 7A is a schematic block diagram of one embodiment of a processor 504A. At least in the illustrated embodiment, the processor 504A includes, among other components, a video conference platform 702, an attendee monitoring module 704, a behavior module 706, and a notification module 708 similar to the video conference platform 602, attendee monitoring module 604, behavior module 606, and notification module 608 in the memory device 502A discussed with reference to FIG. 6A.

Figure 7B:
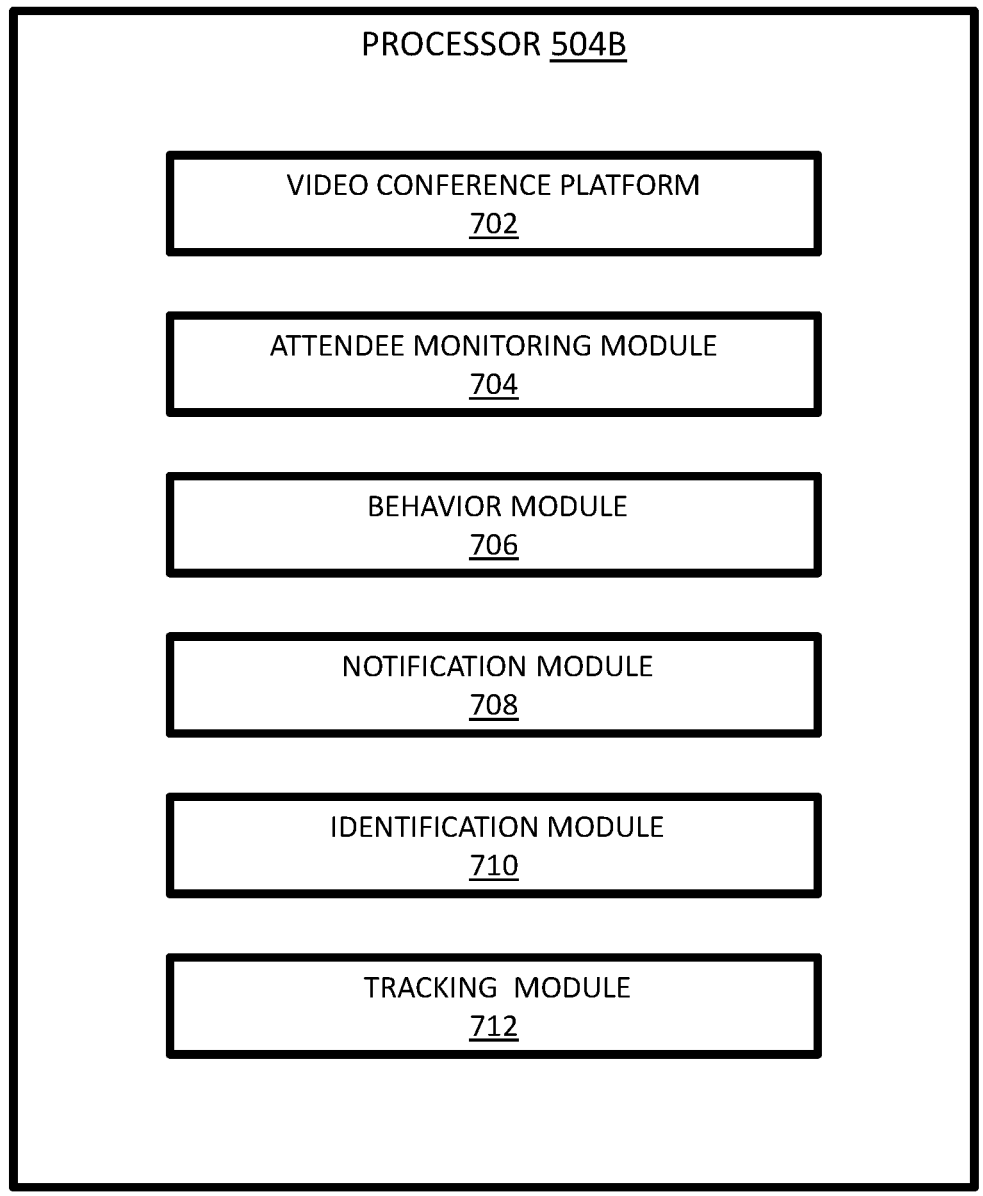

Referring to FIG. 7B, FIG. 7B is a schematic block diagram of another embodiment of a processor 504B. At least in the illustrated embodiment, the processor 504B includes, among other components, a video conference platform 702, an attendee monitoring module 704, a behavior module 706, a notification module 708, an identification module 710, and a tracking module 712 similar to the video conference platform 602, attendee monitoring module 604, behavior module 606, notification module 608, identification module 610, and tracking module 612 in the memory device 502B discussed with reference to FIG. 6B.

Figure 5B:
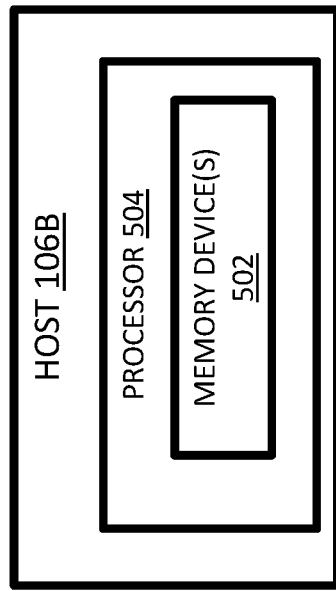

Turning now to FIG. 5B, FIG. 5B is a block diagram of another embodiment of a host 106B. The host 106B includes, among other components, a memory 502 and a processor 504. Alternative to the host 106A, the processor 504 in the host 106B includes the memory device 502 as opposed to the memory device 502 of the host 106A being a different device than and/or independent of the processor 504.

Referring back to FIG. 1, a moderator computing device 108 may include any suitable computing system and/or computing device capable of accessing and/or communicating with the attendee computing devices 104 and the host 106 via the network 102. Examples of a moderator computing device 108 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

Figure 8A:
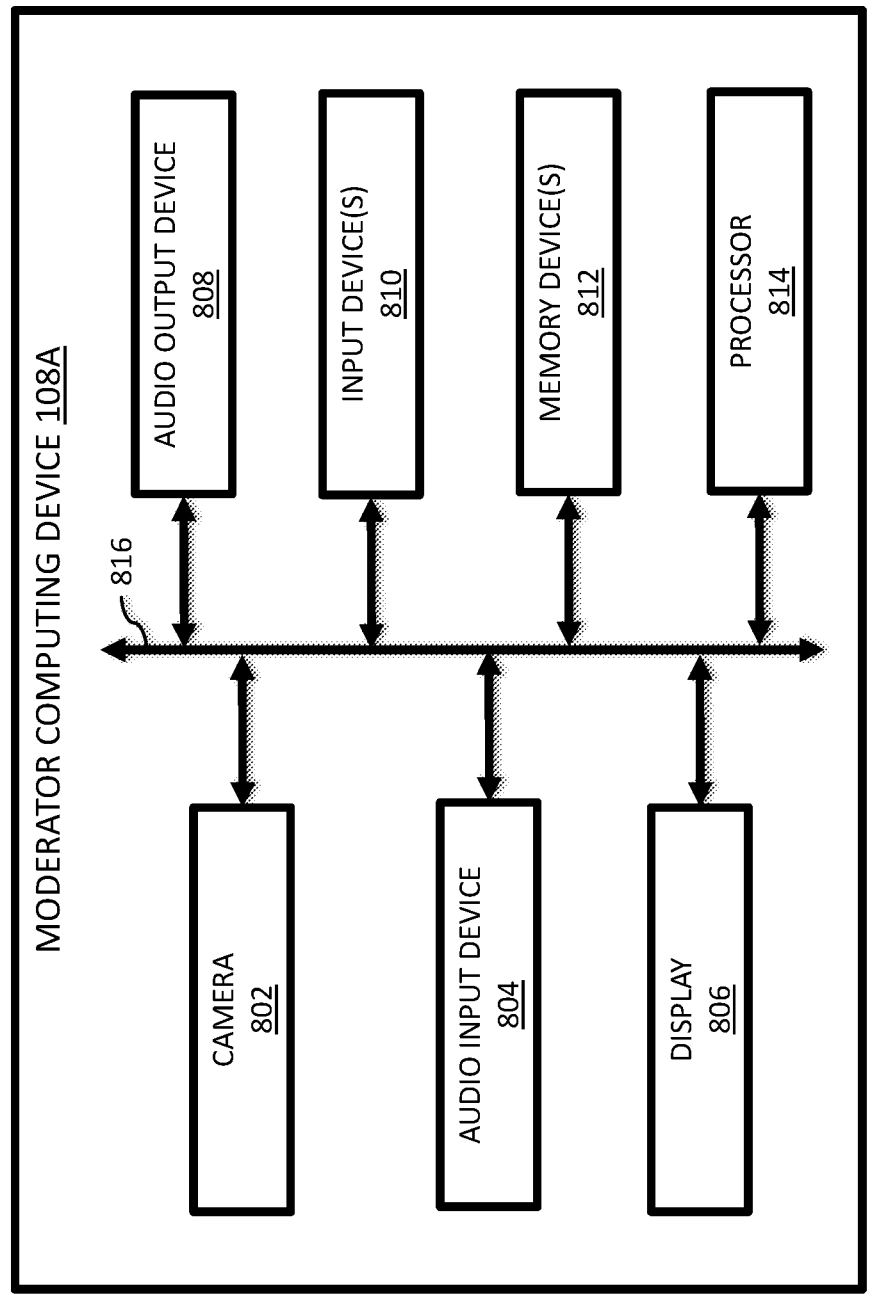
FIGS. 8A and 8B are schematic block diagrams of various embodiments of a moderator computing device included in the computing system of FIG. 1.

With reference to FIG. 8A, FIG. 8A is a block diagram of one embodiment of a moderator computing device 108A. The moderator computing device 108 includes, among other components, a camera 802, an audio input device 804, a display 806, an audio output device 808, and one or more input devices 810 coupled to and/or in communication with one another via a bus 816 (e.g., a wired and/or wireless bus), similar to the camera 202, audio input device 204, display 206, audio output device 208, input device(s) 210, and bus 216 discussed with reference to the attendee computing device 104A and illustrated in FIG. 2A. At least in the illustrated embodiment, the moderator computing device 108 further includes, among other components, one or more memory devices 812 and a processor 814 coupled to an in communication with one another and with the camera 802, audio input device 804, display 806, audio output device 808, and input device(s) 810 via the bus 816.

A set of memory devices 812 may include any suitable quantity of memory devices 212. Further, a memory device 812 may include any suitable type of device and/or system that is known or developed in the future that can store computer-useable and/or computer-readable code. In various embodiments, a memory device 812 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 814).

A memory device 812, in some embodiments, includes volatile computer storage media. For example, a memory device 812 may include RAM, including DRAM, SDRAM, and/or SRAM. In other embodiments, a memory device 812 includes non-volatile computer storage media. For example, a memory device 812 may include a hard disk drive, a flash memory, and/or any other suitable non-volatile computer storage device that is known or developed in the future. In various embodiments, a memory device 812 includes both volatile and non-volatile computer storage media.

Figure 9:
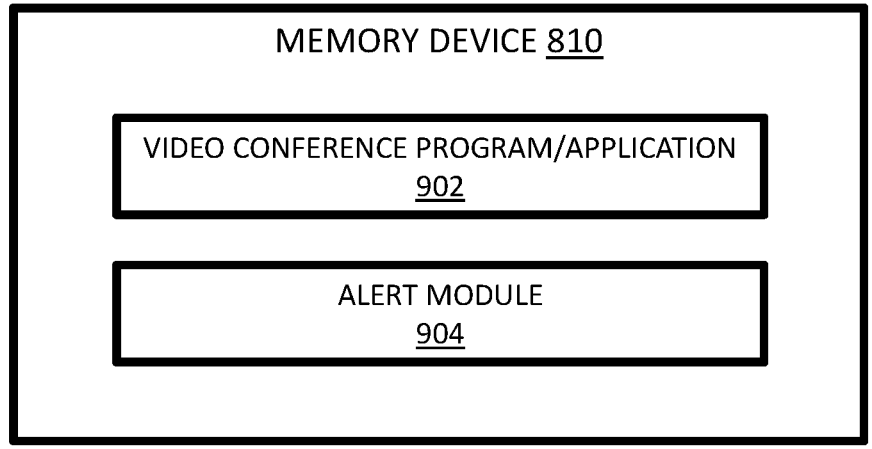
FIG. 9 is a schematic block diagram of one embodiment of a memory device included in the moderator computing devices of FIGS. 8A and 8B.

With reference now to FIG. 9, FIG. 9 is a schematic block diagram of one embodiment of a memory device 812. The memory device 812 includes, among other components, a video conferencing program and/or application 902 similar to the video conferencing program and/or applications 302 and 602 discussed elsewhere herein. At least in the illustrated embodiment, the memory device 812 further includes, among other components, an alert module 904 that is configured to operate/function when executed by the processor 814.

An alert module 904 may include any suitable hardware and/or software than can receive notifications from a host 106 and/or a notification module 608, 708. In various embodiments, alert module 904 may further include any suitable hardware and/or software than can alert a user of the moderator computing device (e.g., a moderator, teacher, boss, etc.) that inappropriate behavior and/or bullying is occurring in the video conference.

The alert may include any suitable audio, visual, and/or tactile alert that is known or developed in the future. In various embodiments, the alert can identify to the moderator each source attendee, the target attendee, the socially inappropriate behavior, the bullying behavior, the auditory cue(s) and/or visual cue(s) exhibited by each source attendee defining the socially inappropriate behavior, and/or the auditory cue(s) and/or visual cue(s) exhibited by each source attendee defining the bullying behavior, among other alerts that are possible and contemplated herein.

Referring back to FIG. 8A, a processor 814 may include any suitable non-volatile/persistent hardware and/or software configured to perform and/or facilitate performing processing functions and/or operations. In various embodiments, the processor 814 includes hardware and/or software for executing instructions in one or more modules and/or applications that can perform and/or facilitate performing functions and/or operations for a video conference. The modules and/or applications executed by the processor 814 can be stored on and executed from a memory device 812 and/or from the processor 814.

Figure 10:
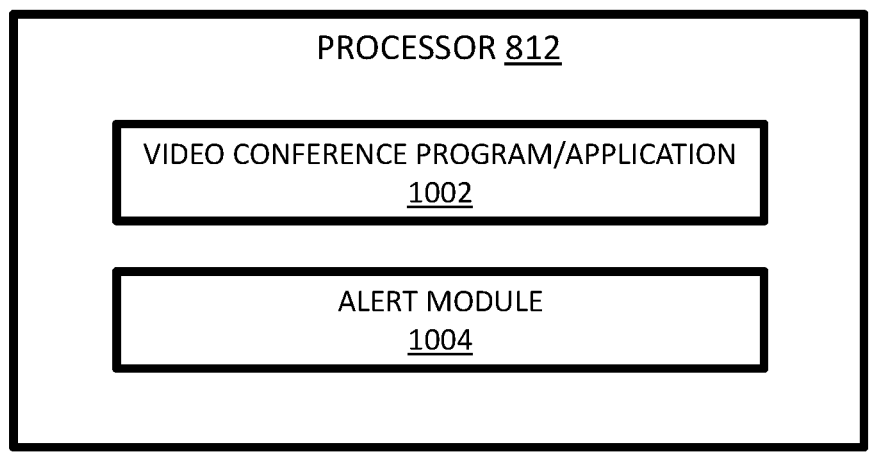
FIG. 10 is a schematic block diagram of one embodiment of a processor included in the moderator computing devices of FIGS. 8A and 8B.

With reference to FIG. 10, FIG. 10 is a schematic block diagram of one embodiment of a processor 814. At least in the illustrated embodiment, the processor 814 includes, among other components, a video conferencing program and/or application 1002 and an alert module 1004 similar to the video conferencing program and/or application 902 and alert module 904 discussed with reference to FIG. 9.

Figure 8B:
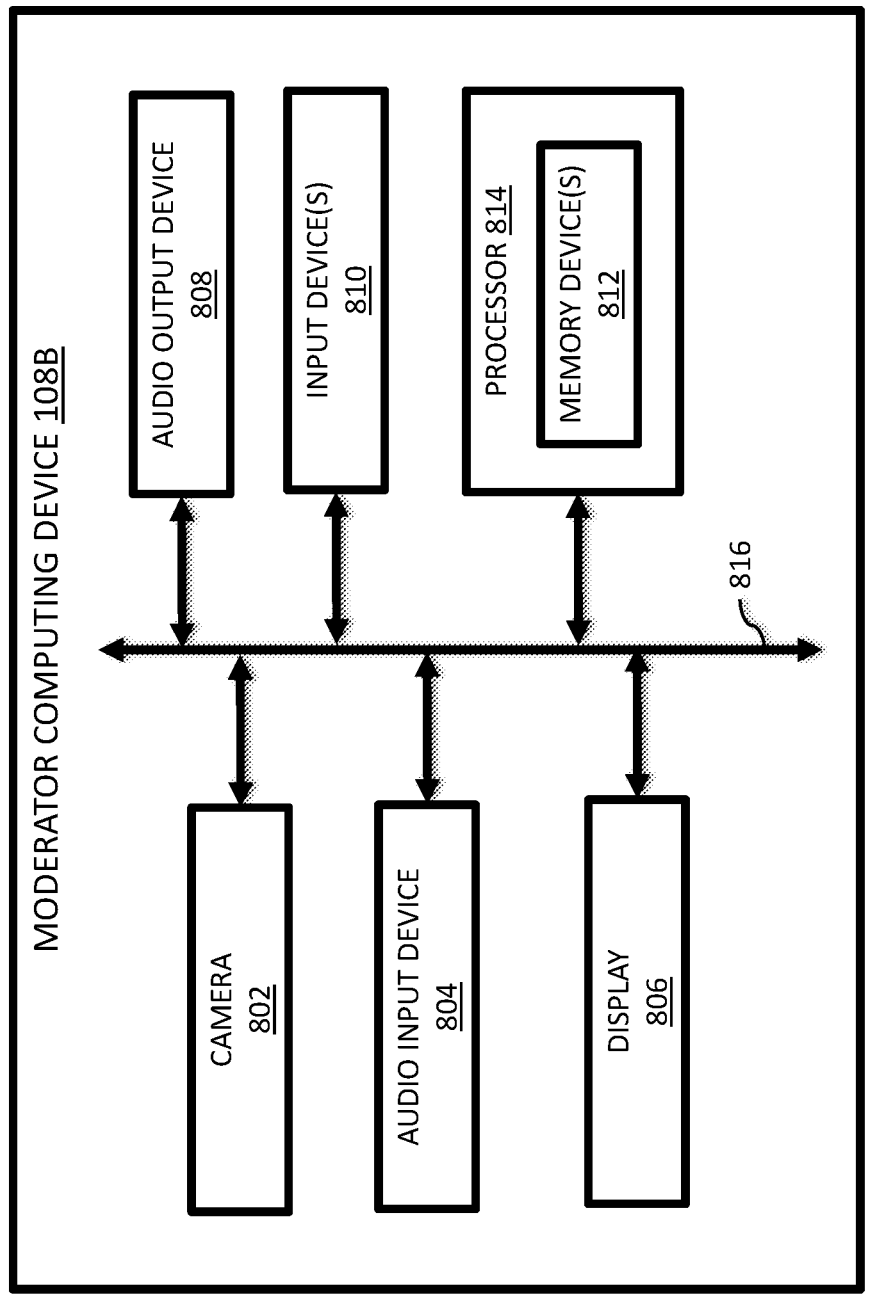

Referring to FIG. 8B, FIG. 8B is a block diagram of another embodiment of a moderator computing device 108B. The moderator computing device 108B includes, among other components, a camera 802, an audio input device 804, a display 806, an audio output device 808, one or more input devices 810, one or more memory devices 812, and a processor 814 coupled to and/or in communication with one another via a bus 816, similar to the camera 802, audio input device 804, display 806, audio output device 808, input device(s) 810, memory device(s) 812, processor 814, and bus 816 discussed with reference to the moderator computing device 108A illustrated in FIG. 8A. Alternative to the moderator computing device 108A, the processor 814 in the moderator computing device 108B includes the memory device(s) 812 as opposed to the memory device(s) 812 of the moderator computing device 108A being a different device than and/or independent of the processor 814.

Figure 12:
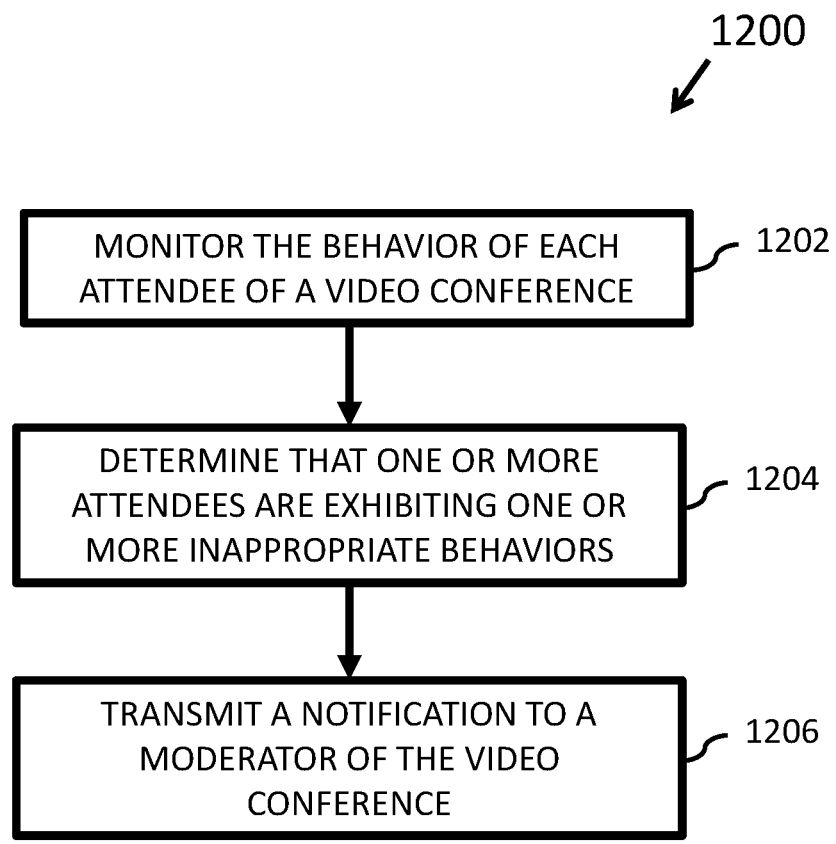
FIGS. 12 through 14 are flow diagrams of various embodiments of a method for monitoring the behavior of attendees of a video conference.

FIG. 12 is a schematic flow chart diagram illustrating one embodiment of a method 1200 for monitoring the behavior of attendees of a video conference. At least in the illustrated embodiment, the method 1200 begins by a processor (e.g., processor 504) monitoring the behavior of each attendee of a video conference (block 1202). The video conference may include, for example, a virtual classroom or virtual meeting, etc., as discussed elsewhere herein.

The processor 504 can determine that one or more attendees (e.g., one or more source attendees) are exhibiting one or more inappropriate behaviors (e.g., bullying) (block 1204). The inappropriate behavior(s) and/or bullying can be determined using any of the techniques, processes, and/or methods for determining inappropriate behavior and/or bullying behavior discussed elsewhere herein. In addition, the source attendee(s) can be identified any of the techniques, processes, and/or methods for identifying a source attendee discussed elsewhere herein.

Further, the processor 504 transmits a notice and/or notification to a moderator (e.g., adult, teacher, boss, etc.) of the video conference in response to determining that one or more attendees are exhibiting the inappropriate behavior(s) (e.g., bullying) (block 1206). The notice/notification can identify each source attendee, the target attendee, the socially inappropriate behavior, the bullying behavior, the auditory cue(s) and/or visual cue(s) exhibited by each source attendee defining the socially inappropriate behavior, and/or the auditory cue(s) and/or visual cue(s) exhibited by each source attendee defining the bullying behavior, etc., among other information that may be included in a notice/notification.

Figure 13:
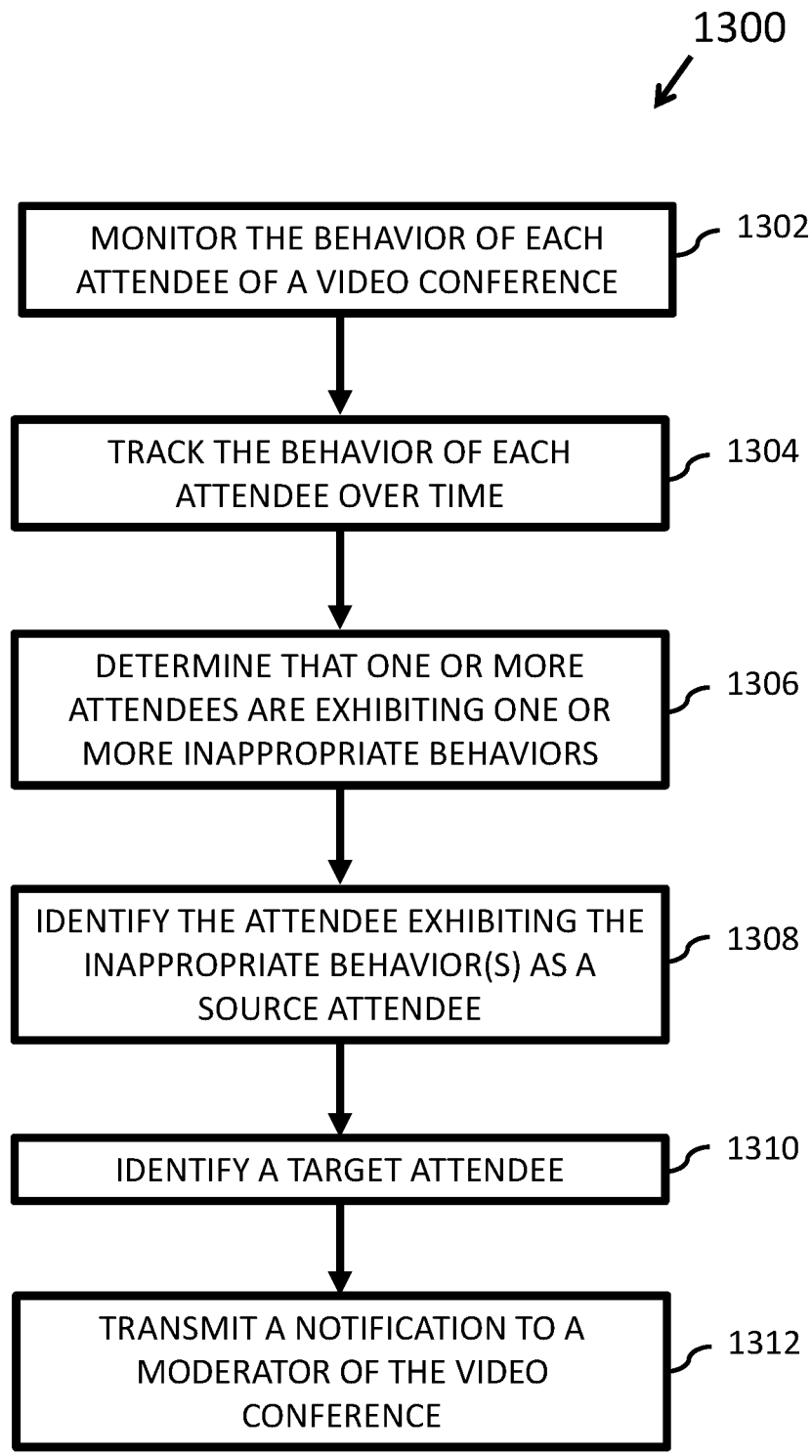

FIG. 13 is a schematic flow chart diagram illustrating another embodiment of a method 1300 for monitoring the behavior of attendees of a video conference. At least in the illustrated embodiment, the method 1300 begins by a processor (e.g., processor 504) monitoring the behavior of each attendee of a video conference (block 1302). The video conference may include, for example, a virtual classroom or virtual meeting, etc., as discussed elsewhere herein.

The processor 504 can also track the behavior of each attendee over time (block 1304). The behavior(s) can be tracked so that the processor 504 can identify correlations between attendees and inappropriate/bullying behavior, as discussed elsewhere herein.

In addition, the processor 504 can determine that one or more attendees (e.g., one or more source attendees) are exhibiting one or more inappropriate behaviors (e.g., bullying) (block 1306). The inappropriate behavior(s) and/or bullying can be determined using any of the techniques, processes, and/or methods for determining inappropriate behavior and/or bullying behavior discussed elsewhere herein. In addition, the source attendee(s) can be identified any of the techniques, processes, and/or methods for identifying a source attendee discussed elsewhere herein.

The processor 504 can identify and/or label each attendee that is exhibiting an inappropriate behavior and/or bullying behavior as, a source attendee (block 1308). Moreover, the processor 504 can identify a target attendee of the inappropriate behavior and/or bullying behavior exhibited by the source attendee(s) (block 1310). An attendee can be identified as the target attendee using any of the techniques, processes, and/or methods for identifying a target attendee discussed elsewhere herein.

Further, the processor 504 transmits a notice and/or notification to a moderator (e.g., adult, teacher, boss, etc.) of the video conference in response to determining that one or more attendees are exhibiting the inappropriate behavior(s) (e.g., bullying) (block 1312). The notice/notification can identify each source attendee, the target attendee, the socially inappropriate behavior, the bullying behavior, the auditory cue(s) and/or visual cue(s) exhibited by each source attendee defining the socially inappropriate behavior, and/or the auditory cue(s) and/or visual cue(s) exhibited by each source attendee defining the bullying behavior, etc., among other information that may be included in a notice/notification.

Figure 14:
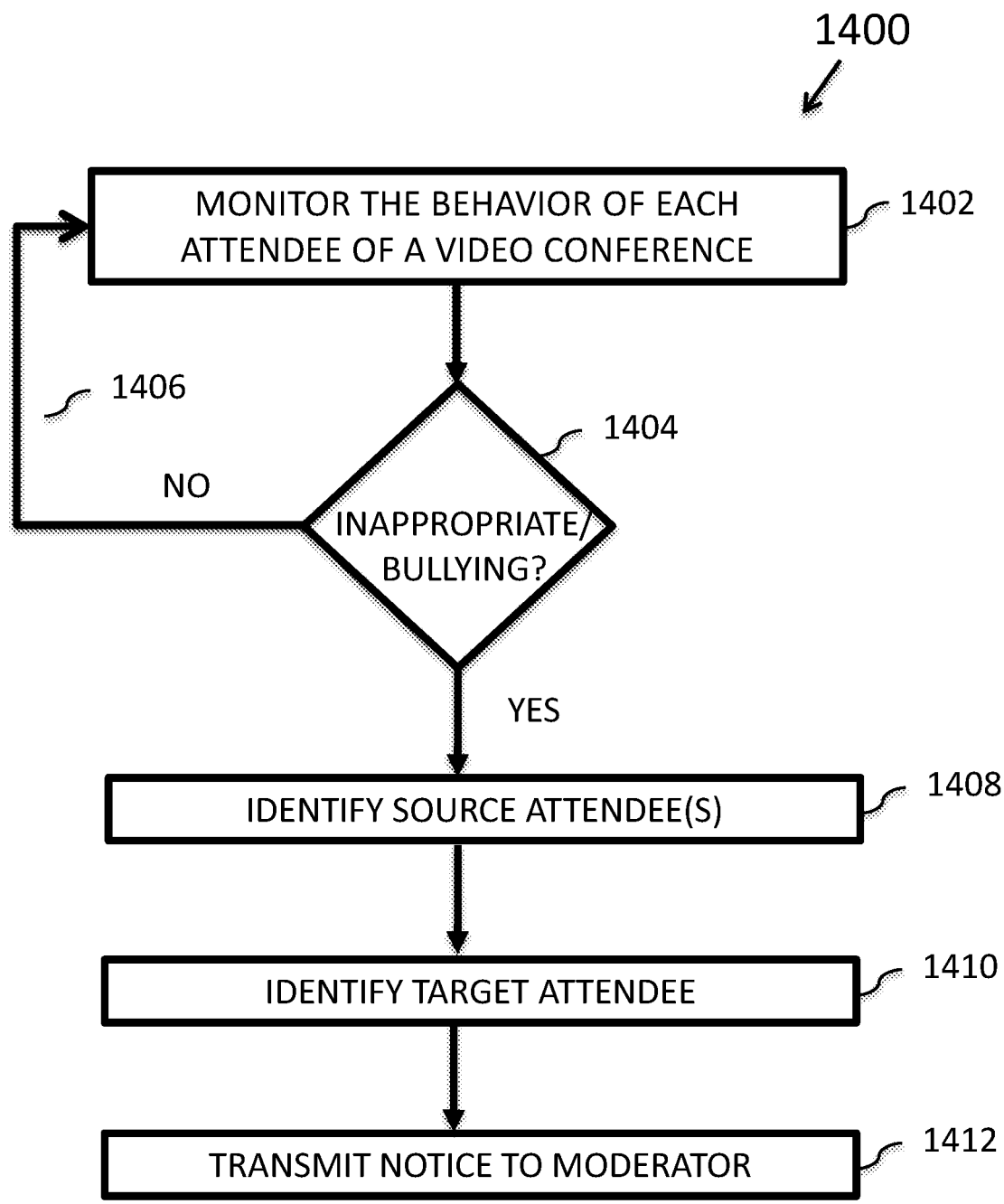

FIG. 14 is a schematic flow chart diagram illustrating another embodiment of a method 1400 for monitoring the behavior of attendees of a video conference. At least in the illustrated embodiment, the method 1400 begins by a processor (e.g., processor 504) monitoring the behavior of each attendee of a video conference (block 1402). The video conference may include, for example, a virtual classroom or virtual meeting, etc., as discussed elsewhere herein.

The processor 504 can determine whether one or more attendees (e.g., one or more source attendees) are exhibiting one or more inappropriate behaviors (e.g., bullying) (block 1404). In response to determining that the behavior(s) exhibited by the attendees are not inappropriate and/or bullying (e.g., a "NO" in block 1404), the processor 504 continues monitoring the behavior of each attendee of a video conference as shown in block 1402 (return 1406).

In response to determining that the behavior(s) exhibited by the attendees are inappropriate and/or bullying (e.g., a "YES" in block 1404), the processor 504 identifies the source attendee(s) (block 1408). The attendee(s) can be identified as the source attendee(s) using any of the techniques, processes, and/or methods for identifying a source attendee discussed elsewhere herein.

The processor 504 can also identify a target attendee of the inappropriate behavior and/or bullying behavior exhibited by the source attendee(s) (block 1410). An attendee can be identified as the target attendee using any of the techniques, processes, and/or methods for identifying a target attendee discussed elsewhere herein.

Further, the processor 504 transmits a notice and/or notification to a moderator (e.g., adult, teacher, boss, etc.) of the video conference in response to determining that one or more attendees are exhibiting the inappropriate behavior(s) (e.g., bullying) (block 1412). The notice/notification can identify each source attendee, the target attendee, the socially inappropriate behavior, the bullying behavior, the auditory cue(s) and/or visual cue(s) exhibited by each source attendee defining the socially inappropriate behavior, and/or the auditory cue(s) and/or visual cue(s) exhibited by each source attendee defining the bullying behavior, etc., among other information that may be included in a notice/notification.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
monitor analog human behavior exhibited by each analog human attendee of a plurality of analog human attendees of a video conference, wherein the video conference includes a live video conference and each analog human attendee of the plurality of analog human attendees of the video conference remotely participates in the video via a respective live stream of their actual analog self via a respective computing device including a respective display including a respective layout of the video conference on their respective display and in which a plurality of analog source human attendees include different display positions of an analog target human attendee on their respective layouts, the analog target human attendee including an intended human recipient of one or more inappropriate analog human to human behaviors performed by the plurality of analog source human attendees,
track the eyes of each analog human attendee of the video conference relative to their respective layouts being displayed on their respective displays to determine a direction each analog human attendee is looking during the video conference,
based on a direction where each analog source human attendee's eyes are focused, map the respective direction of a focus of each analog source human attendee's eyes on their respective different layouts over time and cross reference each respective mapped direction with each other to identify which analog human attendee of the video conference is the intended human recipient of the one or more inappropriate analog human to human behaviors performed by the plurality of analog source human attendees,
determine, in real-time, that the analog human behavior exhibited by the plurality of analog source human attendees of the video conference as transmitted within their respective live stream includes the one or more inappropriate analog human to human behaviors that are directed to the intended human recipient and identify the analog target human attendee of the video conference based thereon, and
transmit a notification to a moderator of the video conference in response to determining that the analog human behavior exhibited by the plurality of analog source human attendees of the video conference as transmitted within their respective live stream includes the one or more inappropriate analog human to human behaviors directed to the analog target human attendee, wherein the notification identifies each analog source human attendee, the analog target human attendee, and each inappropriate analog human to human behavior exhibited by each analog source human attendee via their respective live stream that is intended for and directed to the analog target human attendee.

2. The apparatus of claim 1, wherein:
the video conference includes a virtual classroom;
the one or more inappropriate analog human to human behaviors within the respective stream of the plurality of analog source human attendees includes bullying directly from one or more first students aimed at one or more second students in the virtual classroom; and
the moderator comprises a teacher or an adult in the virtual classroom.

3. The apparatus of claim 2, wherein:
the code executable by the processor further causes the processor to track over time the analog human behaviors exhibited by each analog source attendee of the virtual classroom; and
bullying comprises the analog target human attendee being the intended human recipient of the one or more inappropriate analog human to human behaviors exhibited by the plurality of analog source human attendees on one or more previous occasions during the tracked time.

4. The apparatus of claim 1, wherein:
determining that the analog human behavior exhibited by the plurality of analog source human attendees of the video conference include the one or more inappropriate analog human to human behaviors that are directed to the intended human recipient and identify the analog target human attendee of the video conference comprises:
  observing each analog human behavior exhibited by each analog human attendee during the video conference,
  comparing each analog human behavior exhibited by each analog human attendee during the video conference to a set of inappropriate analog human to human behaviors to determine a match, and
  identifying each inappropriate analog human to human behavior exhibited by each analog human attendee of the video conference based on each particular analog human behavior exhibited by each particular analog human attendee matching a corresponding inappropriate analog human behavior; and
the code executable by the processor further causes the processor to identify each analog source human attendee based on at least one analog human behavior exhibited by an analog human attendee of the video conference matching the one or more inappropriate analog human to human behaviors.

5. The apparatus of claim 4, wherein:
the code executable by the processor further causes the processor to identify the analog target human attendee;
identifying the analog target human attendee comprises
  determining the analog human target of the one or more inappropriate analog human to human behaviors exhibited by the plurality of analog source human attendees;
  identifying the analog target human of the one or more inappropriate analog human to human behaviors comprises:
    determining a respective direction of the one or more inappropriate analog human to human behaviors exhibited by each analog source human attendee, and
    mapping and cross referencing each respective direction of the plurality of analog human to human inappropriate behaviors exhibited by each analog source human attendee to a particular analog human attendee of the video conference; and
the analog target human attendee is the particular analog human attendee of the video conference to which the one or more inappropriate analog human to human behaviors exhibited by each analog source human attendee are intended and directed.

6. A method, comprising:
monitoring, by a processor, analog human behavior exhibited by each analog human attendee of a plurality of analog human attendees of a video conference, wherein the video conference includes a live video conference and each analog human attendee of the plurality of analog human attendees of the video conference remotely participates in the video conference via a respective live stream of their actual self via a respective computing device including a respective display including a respective layout of the video conference on their respective display and in which a plurality of analog source human attendees include different display positions of an analog target human attendee on their respective layouts, the analog target human attendee including an intended human recipient of one or more inappropriate analog human to human behaviors performed by the plurality of analog source human attendees;
tracking the eyes of each analog human attendee of the video conference relative to their respective layouts being displayed on their respective displays to determine a direction each analog human attendee is looking during the video conference;
based on a direction where each analog source human attendee's eyes are focused, mapping the respective direction of a focus of each analog source human attendee's eyes on their respective different layouts over time and cross reference each respective mapped direction with each other to identify which analog human attendee of the video conference is the intended human recipient of the one or more inappropriate analog human to human behaviors performed by the plurality of analog source human attendees;
determining, in real-time, that the analog human behavior exhibited by the plurality of analog source human attendees of the video conference within their respective live stream includes the one or more inappropriate analog human to human behaviors that are directed to the intended human recipient and identify the analog target human attendee of the video conference based thereon; and
transmitting a notification to a moderator of the video conference in response to determining that the analog human behavior exhibited by the plurality of analog source human attendees of the video conference within their respective live stream includes the one or more inappropriate analog human to human behaviors directed to the analog target human attendee,
wherein the notification identifies each analog source human attendee, the analog target human attendee, and each inappropriate analog human to human behavior exhibited by each analog source human attendee via their respective live stream that is intended for and directed to the analog target human attendee.

7. The method of claim 6, wherein:
the video conference includes a virtual classroom;
the one or more inappropriate analog human to human behaviors within the respective stream of the plurality of analog source human attendees includes bullying directly from one or more first students aimed at one or more second students in the virtual classroom; and
the moderator comprises a teacher or an adult in the virtual classroom.

8. The method of claim 7, wherein:
the method further comprises tracking over time the analog human behaviors exhibited by each analog source human attendee of the virtual classroom; and
bullying comprises the analog target human attendee being the intended human recipient of the one or more inappropriate analog human to human behaviors exhibited by the plurality of analog source human attendees on one or more previous occasions during the tracked time.

9. The method of claim 6, wherein:
determining that the analog human behavior exhibited by the plurality of analog source human attendees of the video conference include the one or more inappropriate analog human to human behaviors that are directed to the intended human recipient and identify the analog target human attendee of the video conference comprises:
 observing each analog human behavior exhibited by each analog human attendee during the video conference,
 comparing each analog human behavior exhibited by each analog human attendee during the video conference to a set of inappropriate analog human to human behaviors to determine a match, and
 identifying each inappropriate analog human to human behavior exhibited by each analog human attendee of the video conference based on each particular analog human behavior exhibited by each particular analog human attendee matching a corresponding inappropriate analog human behavior; and
the method further comprises identifying each analog source human attendee based on at least one analog human behavior exhibited by an analog human attendee of the video conference matching the one or more inappropriate analog human to human behaviors.

10. The method of claim 9, wherein:
the method further comprises identifying the analog target human attendee;
identifying the analog target human attendee comprises determining an analog human target of the one or more inappropriate analog human to human behaviors exhibited by the plurality of analog source human attendees;
determining the analog human target of the one or more inappropriate analog human to human behaviors comprises:
 determining a respective direction of the one or more inappropriate analog human to human behaviors exhibited by each analog source human attendee, and
 mapping each respective direction of the one or more inappropriate analog human to human behaviors exhibited by each analog source human attendee to a particular analog human attendee of the video conference; and
the analog target human attendee is the particular analog human attendee of the video conference to which the one or more inappropriate analog human to human behaviors exhibited by each analog source human attendee are intended and directed.

11. A computer program product comprising a non-transitory computer-readable medium including code embodied therewith, the code executable by a processor to cause the processor to:
 monitor analog human behavior exhibited by each analog human attendee of a plurality of analog human attendees of a video conference, wherein video conference includes a live video conference and each analog human attendee of the plurality of analog human attendees of the video conference remotely participates in the video conference via a respective live stream of their actual self via a respective computing device including a respective display including a respective layout of the video conference on their respective display and in which a plurality of analog source human attendees include different display positions of an analog target human attendee on their respective layouts, the analog target human attendee including an intended human recipient of one or more inappropriate analog human to human behaviors performed by the plurality of analog source human attendees;
 track the eyes of each analog human attendee of the video conference relative to their respective layouts being displayed on their respective displays to determine a direction each analog human attendee is looking during the video conference;
 based on a direction where each analog source human attendee's eyes are focused, map the respective direction of a focus of each analog source human attendee's eyes on their respective different layouts and cross reference each respective mapped direction with each other to identify which analog human attendee of the video conference is the intended human recipient of the one or more inappropriate analog human to human behaviors performed by the plurality of analog source human attendees;
 determine, in real-time, that the analog human behavior exhibited by the plurality of analog source human attendees of the video conference within their respective live stream includes the one or more inappropriate analog human to human behaviors that are directed to the intended human recipient and identify the analog target human attendee of the video conference based thereon; and
 transmit a notification to a moderator of the video conference in response to determining that the analog human behavior exhibited by the plurality of analog source human attendees of the video conference within their respective live stream includes the one or more inappropriate analog human to human behaviors directed to the analog target human attendee,
 wherein the notification identifies each analog source human attendee, the analog target human attendee, and each inappropriate analog human to human behavior exhibited by each analog source human attendee via their respective live stream that is intended for and directed to the analog target human attendee.

12. The computer program product of claim 11, wherein:
the video conference includes a virtual classroom;
the one or more inappropriate analog human to human behaviors within the respective stream of the plurality of analog source human attendees includes bullying directly from one or more first students aimed at one or more second students in the virtual classroom; and the moderator comprises a teacher or an adult in the virtual classroom.

13. The computer program product of claim 7, wherein:
the code further causes the processor to track over time the analog human behaviors exhibited by each analog source human attendee of the virtual classroom; and
bullying comprises the analog target human attendee being the intended human recipient of the one or more inappropriate analog human to human behaviors exhibited by the plurality of analog source human attendees on one or more previous occasions during the tracked time.

14. The computer program product of claim 11, wherein:
the code that causes the processor to determine that the analog human behavior exhibited by the plurality of analog source human attendees of the video conference include the one or more inappropriate analog human to human behaviors that are directed to the intended human recipient and identify the analog target human attendee of the video conference comprises code that causes the processor to:
  observe each analog human behavior exhibited by each analog human attendee during the video conference,
  compare each analog human behavior exhibited by each analog human attendee during the video conference to a set of inappropriate analog human to human behaviors to determine a match, and
  identify each inappropriate analog human behavior exhibited by each analog human attendee of the video conference based on each particular analog human behavior exhibited by each particular analog human attendee matching a corresponding inappropriate analog human behavior; and
the code further causes the processor to identify each analog source human attendee based on at least one analog human behavior exhibited by an analog human attendee of the video conference matching the one or more inappropriate analog human to human behaviors.

15. The computer program product of claim 14, wherein:
the code further causes the processor to identify the analog target human attendee;
identifying the analog target human attendee comprises determining an analog human target of the one or more inappropriate analog human to human behaviors exhibited by the plurality of analog source human attendees;
identifying the analog human target of the one or more inappropriate analog human to human behaviors comprises:
  determining a respective direction of the one or more inappropriate analog human to human behaviors exhibited by each analog source human attendee, and
  mapping and cross referencing each respective direction of the one or more inappropriate analog human to human behaviors exhibited by each analog source human attendee to a particular analog human attendee of the video conference; and
the analog target human attendee is the particular analog human attendee of the video conference to which the one or more inappropriate analog human to human behaviors exhibited by each analog source human attendee are intended and directed.

\* \* \* \* \*